US012264496B2

(12) United States Patent
Barker et al.

(10) Patent No.: US 12,264,496 B2
(45) Date of Patent: Apr. 1, 2025

(54) CYLINDRICAL LOCK WITH A CLUTCHING AND A NON-CLUTCHING CONFIGURATION

(71) Applicant: Schlage Lock Company LLC, Carmel, IN (US)

(72) Inventors: Kenton H. Barker, Colorado Springs, CO (US); David J. Hurlbert, Manitou Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 109 days.

(21) Appl. No.: 17/857,682

(22) Filed: Jul. 5, 2022

(65) Prior Publication Data

US 2023/0026356 A1 Jan. 26, 2023

Related U.S. Application Data

(62) Division of application No. 16/002,591, filed on Jun. 7, 2018, now Pat. No. 11,377,872.

(51) Int. Cl.
*E05B 13/00* (2006.01)
*E05B 9/04* (2006.01)
(Continued)

(52) U.S. Cl.
CPC .............. *E05B 13/004* (2013.01); *E05B 9/04* (2013.01); *E05B 15/0033* (2013.01);
(Continued)

(58) Field of Classification Search
CPC ................... E05B 41/00; E05B 55/005; E05B 2047/0031; E05B 47/0692; E05B 63/16;
(Continued)

(56) References Cited

U.S. PATENT DOCUMENTS 2,793,522 A 5/1957 Tornoe
2,983,134 A 5/1961 Russell et al.
(Continued)

FOREIGN PATENT DOCUMENTS

WO 2017205871 A1 11/2017

OTHER PUBLICATIONS

Canadian Office Action; Canadian Intellectual Property Office; Canadian Patent Application No. 3,106,504; Mar. 25, 2022; 4 pages.
(Continued)

*Primary Examiner* — Mark A Williams
(74) *Attorney, Agent, or Firm* — Taft Stettinius & Hollister LLP

(57) ABSTRACT

The present disclosure is directed to a lock assembly that can be converted between a clutching and non-clutching orientation by rotating an outer housing 180 degrees relative to an outside drive assembly. The outer housing includes a notch and an elongate arcuate slot formed in the inner surface of the outer housing adjacent a through aperture and across from one another. A lock control lug is moveably coupled with the outside drive assembly and is selectively engageable with the notch or the arcuate slot of the outer housing. An outer lever is placed in a non-clutching configuration when the lock control lug is engaged with the notch and in a clutching configuration when the lock control lug is engaged with the arcuate slot.

20 Claims, 15 Drawing Sheets

(51) Int. Cl.
*E05B 15/00* (2006.01)
*E05B 41/00* (2006.01)
*E05B 55/00* (2006.01)

(52) U.S. Cl.
CPC ............ *E05B 41/00* (2013.01); *E05B 55/005* (2013.01); *E05B 2009/046* (2013.01)

(58) Field of Classification Search
CPC ........... E05B 13/004; E05B 2063/0082; E05B 55/00; E05B 13/002; E05B 15/0033; E05B 17/04; E05B 2009/046; E05B 2047/0026; E05B 47/0673; E05B 81/16; E05B 85/06; E05B 9/04; Y10T 70/5832; Y10T 70/5416; Y10T 70/5827; Y10T 292/57; Y10T 292/96; Y10T 292/59; Y10T 70/5823; E05C 1/163
See application file for complete search history.

(56) References Cited

U.S. PATENT DOCUMENTS 4,920,773 A 5/1990 Surko, Jr.
5,018,375 A * 5/1991 Tully .................... E05B 47/068 292/144
5,263,348 A 11/1993 Wittwer
5,657,653 A 8/1997 Hensley et al.
5,794,472 A * 8/1998 Kester ................... E05B 55/005 70/472
5,934,117 A 8/1999 Shen
6,189,351 B1 2/2001 Eagan et al.
6,206,164 B1 3/2001 Kurita
6,223,567 B1 5/2001 Fadul
6,543,264 B2 4/2003 Frolov
6,575,006 B1 6/2003 Don
6,619,705 B2 9/2003 Dalsing
6,705,138 B1 * 3/2004 Shen ....................... E05B 55/06 292/336.3
6,711,924 B2 3/2004 Ritz
6,802,194 B1 * 10/2004 Shen ..................... E05B 55/005 70/472
6,868,704 B2 3/2005 Simon et al.
6,979,029 B2 12/2005 Shen
6,993,945 B1 * 2/2006 Chen ..................... E05B 13/101 70/222
7,178,373 B2 * 2/2007 Shen ................... E05B 17/0062 292/169.22
7,516,633 B1 4/2009 Chang
7,559,219 B2 7/2009 Chen
7,793,527 B2 9/2010 Shen
7,963,134 B2 6/2011 Rafferty et al.
7,966,854 B2 6/2011 Ocana
8,051,689 B1 * 11/2011 Shen ..................... E05B 47/068 70/279.1
8,292,336 B2 10/2012 Moon
8,356,499 B2 * 1/2013 Peng ..................... E05B 47/068 70/279.1
8,844,330 B2 * 9/2014 Moon ................... E05B 55/005 292/336.3
9,181,730 B1 * 11/2015 Peng ..................... E05B 47/068
9,371,671 B2 * 6/2016 Weathersby ............ E05C 1/163
9,435,143 B2 * 9/2016 Shen ..................... E05B 55/005
9,859,069 B2 * 1/2018 Sambar ................... E05B 17/22
2007/0157684 A1 7/2007 Bogdanov et al.
2007/0209412 A1 9/2007 Shiramizu et al.
2008/0011030 A1 1/2008 Ferreira Sanchez et al.
2008/0245119 A1 10/2008 Katagiri
2008/0307836 A1 * 12/2008 Kim ........................ E05B 3/065 70/91
2009/0025438 A1 * 1/2009 Don ...................... E05B 47/068 70/277
2010/0122561 A1 * 5/2010 Lui ....................... E05B 47/068 70/277
2010/0263418 A1 10/2010 Moon
2012/0212001 A1 * 8/2012 Benitez ................... E05B 17/22 340/5.1
2013/0234453 A1 * 9/2013 Murphy .................. E05B 3/065 292/226
2013/0239631 A1 9/2013 Moon et al.
2016/0017634 A1 1/2016 Parker et al.
2017/0342740 A1 11/2017 Basavaraju et al.

OTHER PUBLICATIONS

Australian First Examination Report; Australia Patent Office; Australian Patent Application No. 2019281012; Dec. 8, 2021; 6 pages.
Australian Second Examination Report; Australia Patent Office; Australian Patent Application No. 2019281012; Jan. 21, 2022; 3 pages.
International Search Report; International Searching Authority; International Application No. PCT/US2019/036065; Sep. 9, 2019; 2 pages.
Written Opinion; International Searching Authority; European Patent Office; International Application No. PCT/US2019/036065; Sep. 9, 2019; 5 pages.
New Zealand Examination Report, New Zealand Intellectual Property Office, New Zealand Patent Application No. 771870, Jan. 12, 2023, 4 pages.
New Zealand Examination Report, New Zealand Intellectual Property Office, New Zealand Patent Application No. 771870, Feb. 3, 2023, 1 page.
New Zealand Examination Report, New Zealand Intellectual Property Office, New Zealand Patent Application No. 771870, Jan. 20, 2023, 2 pages.

* cited by examiner

CYLINDRICAL LOCK WITH A CLUTCHING AND A NON-CLUTCHING CONFIGURATION

CROSS REFERENCE TO RELATED APPLICATIONS

This application is a divisional of U.S. patent application Ser. No. 16/002,591 filed Jun. 7, 2018 and issued as U.S. Pat. No. 11,377,872, the contents of which are hereby incorporated herein by reference in their entirety.

TECHNICAL FIELD

The present disclosure generally relates to a cylindrical lock and more particularly, but not exclusively to a cylindrical lock that can be converted between a clutching configuration and a non-clutching configuration without utilizing additional components.

BACKGROUND

Lock mechanisms with lever actuators are connected to movable structures such as doors or windows and the like to prevent unauthorized opening of the structure. The lever actuator of the lock mechanism can be either a clutch type configuration or a non-clutch type configuration. A clutch type configuration allows the lever actuator to pivot about a predefined angle and the non-clutch configuration prevents pivoting movement of the lever actuator when the lock mechanism is locked. Some prior art lock mechanisms can be difficult and/or time consuming to reconfigure between a clutching and a non-clutching configuration. Accordingly, there remains a need for further contributions in this area of technology.

SUMMARY

One embodiment of the present disclosure includes a lock mechanism with that can be reconfigured between a clutching configuration and a non-clutching configuration. Other embodiments include apparatuses, systems, devices, hardware, methods, and combinations for a lock mechanism that can be reconfigured between a clutching configuration and a non-clutching configuration without the use of additional components. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
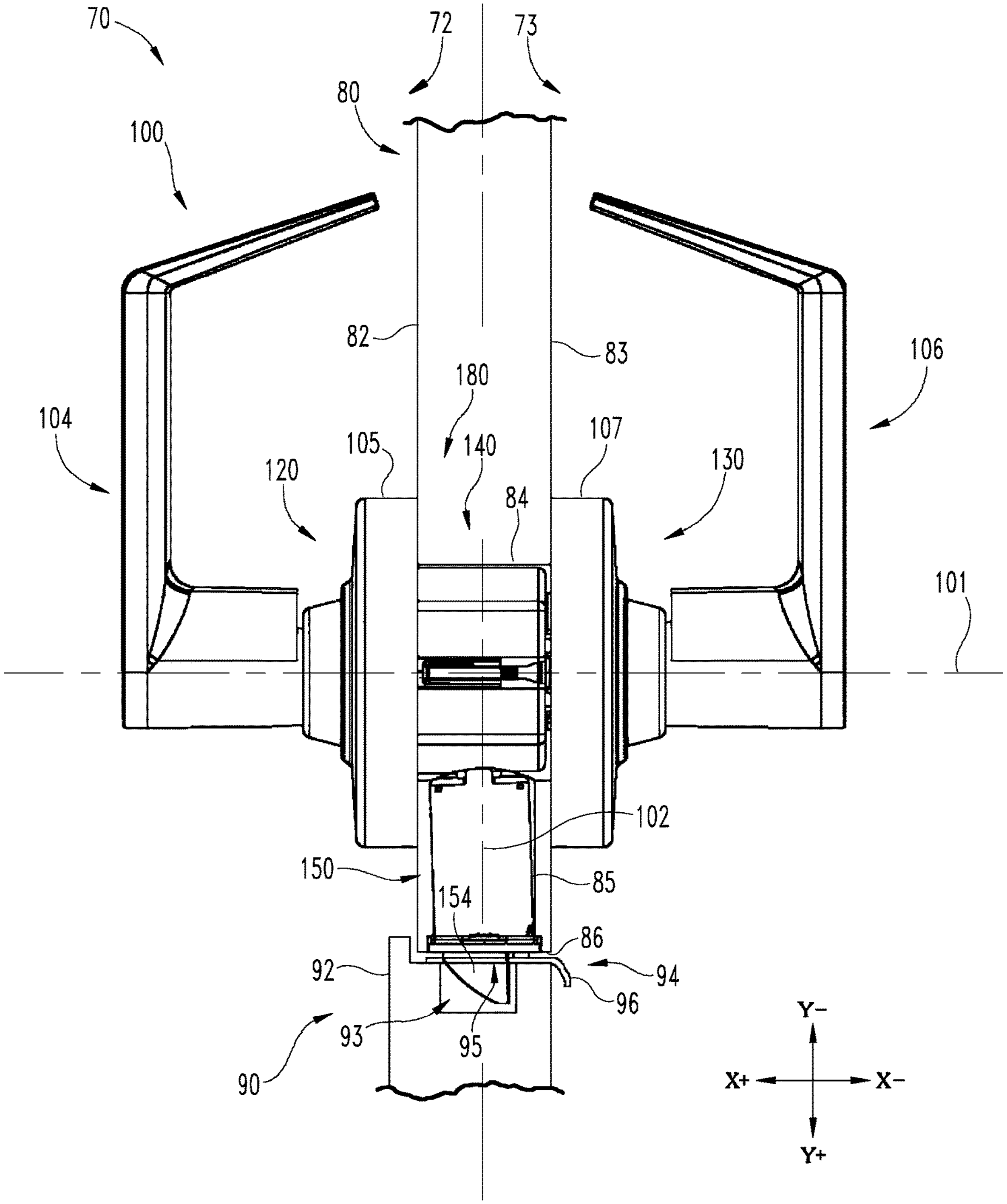
FIG. 1 is a cross-sectional view of a portion of a handle and lock assembly according to one embodiment of the present disclosure.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As used herein, the terms “longitudinal,” “lateral,” and “transverse” are used to denote motion or spacing along three mutually perpendicular axes, wherein each of the axes defines two opposite directions. In the coordinate system illustrated in the various figures, the X-axis defines first and second longitudinal directions, the Y-axis defines first and second lateral directions, and the Z-axis defines first and second transverse directions. Additionally, the descriptions that follow may refer to the directions defined by the axes with specific reference to the orientations illustrated in the Figures. For example, the longitudinal directions may be referred to as the proximal direction (X+) and the distal direction (X−), the lateral directions may be referred to as the extending or laterally outward direction (Y+) and the retracting or laterally inward direction (Y−), and the transverse directions may be referred to as the upward direction (Z+) and the downward direction (Z−). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

Figure 2:
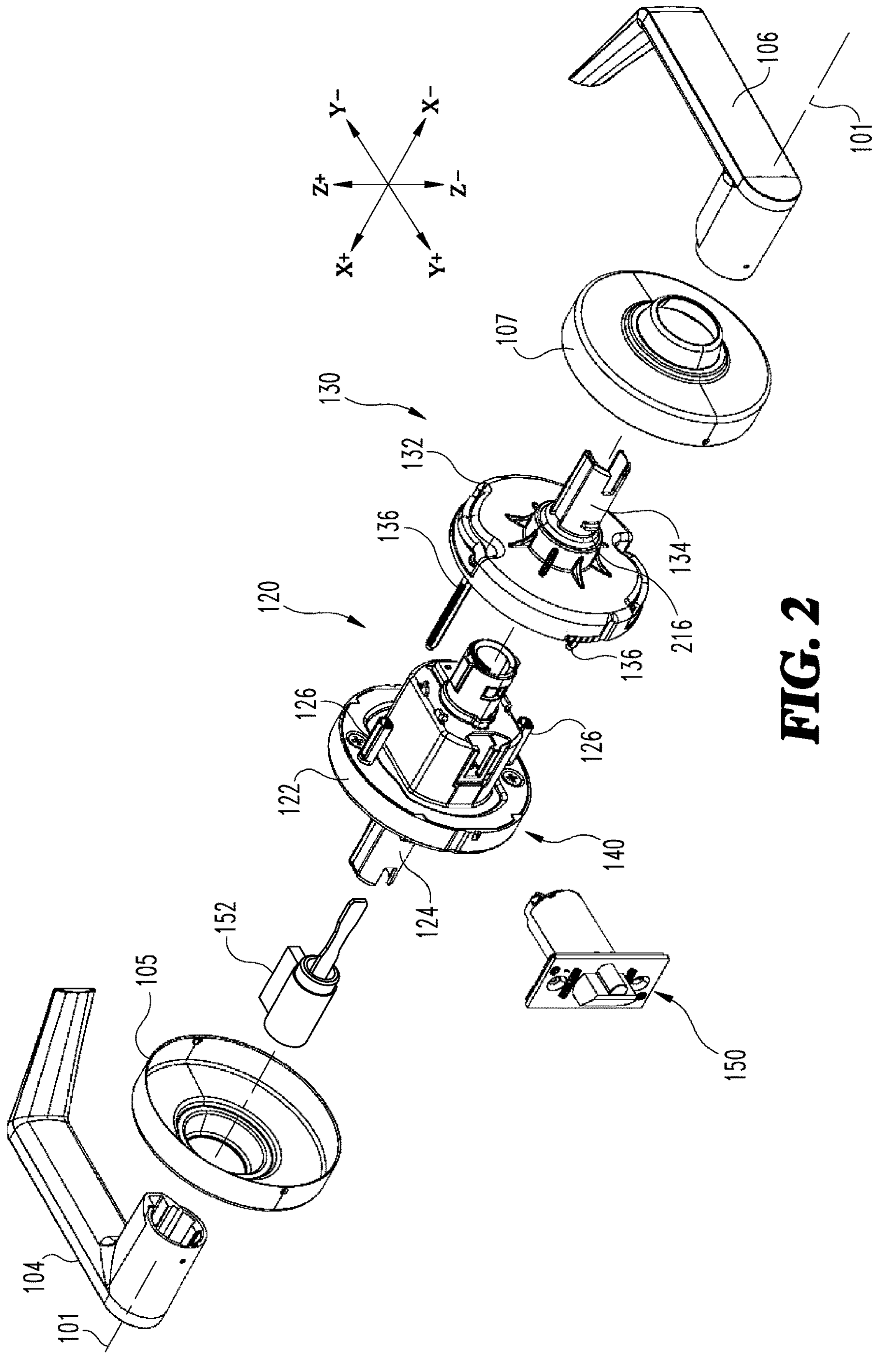
FIG. 2 is an exploded perspective view of portions of the lock assembly of FIG. 1.

Referring now to FIG. 1, illustrated therein is a cylindrical lock assembly 100 according to certain embodiments. More specifically, FIG. 1 illustrates a closure assembly 70 including a door 80, a frame 90, and the lock assembly 100. FIG. 2 is a partially-exploded assembly view of the lock assembly 100. The closure assembly 70 may define a boundary between an outer or unsecured region 72 and an inner or secured region 73. The door 80 is pivotally mounted to a hinge frame (not shown) for swinging movement between an open position and a closed position. With the door 80 in the closed position, an outer or unsecured side 82 of the door 80 faces the outer or unsecured region 72, and an inner or secured side 83 of the door 80 faces the inner or secured region 73. The door 80 also includes a cross-bore 84 that extends longitudinally through the thickness of the door 80, and an edge bore 85 that extends laterally between the cross-bore 84 and the free edge 86 of the door 80.

The lock assembly 100 generally includes an outside drive assembly 120 for mounting to the outer side 82 of the door 80, an inside drive assembly 130 for mounting to the inner side 83 of the door 80, a chassis 140 for mounting in the cross-bore 84, and a latchbolt mechanism 150 for mounting in the edge bore 85. The lock assembly 100 has a longitudinal rotational axis 101 about which certain components of the lock assembly 100 rotate, and a lateral retraction axis 102 along which a latchbolt 154 of the latchbolt mechanism 150 extends and retracts. The lock assembly 100 also includes an outside handle 104 and an outside rose 105, each of which is mounted to the outside drive assembly 120. The lock assembly 100 further includes an inside handle 106 and an inside rose 107, each of which is mounted to the inside drive assembly 130. In the illustrated embodiment, each of the outside handle 104 and the inside handle 106 is provided in the form of a lever. It is also contemplated that one or both of the handles 104, 106 may be provided in another form, such as a knob. As described hereinafter, at least one of the handles 104, 106 is at least selectively operable to effect retraction of the latchbolt 154.

A latch jamb 92 is operable to engage the latchbolt mechanism 150 when the door 80 is in the closed positon. The latch jamb 92 includes a pocket 93 operable to receive an end portion of the latchbolt 154. A strike plate 94 is mounted to the latch jamb 92, and includes an opening 95 aligned with the pocket 93. As the door 80 moves from the open position to the closed position, a ramp 96 of the strike plate 94 engages the latchbolt 154, thereby driving the latchbolt 154 from an extended position to a retracted position. When the latchbolt 154 becomes aligned with the strike opening 95, the latchbolt 154 returns to its extended position and enters the pocket 93, thereby latching the door 80 in its closed position.

Referring now to FIGS. 2-5, the outside drive assembly 120 generally includes an outer spring cage housing 122, an outside drive spindle 124 mounted to the housing 122 for rotation about the rotational axis 101, and a pair of mounting posts 126 extending distally from the housing 122. Similarly, the inside drive assembly 130 generally includes an inside housing 132, an inside drive spindle 134 mounted to the housing 132 for rotation about the rotational axis 101, and a pair of mounting bolts 136 operable to engage the mounting posts 126 to secure the outside drive assembly 120 to the inside drive assembly 130, thereby securing the lock assembly 100 to the door 80. A cylinder assembly 152 is connected between the outer handle 104 and the outside drive assembly 120.

Figure 3:
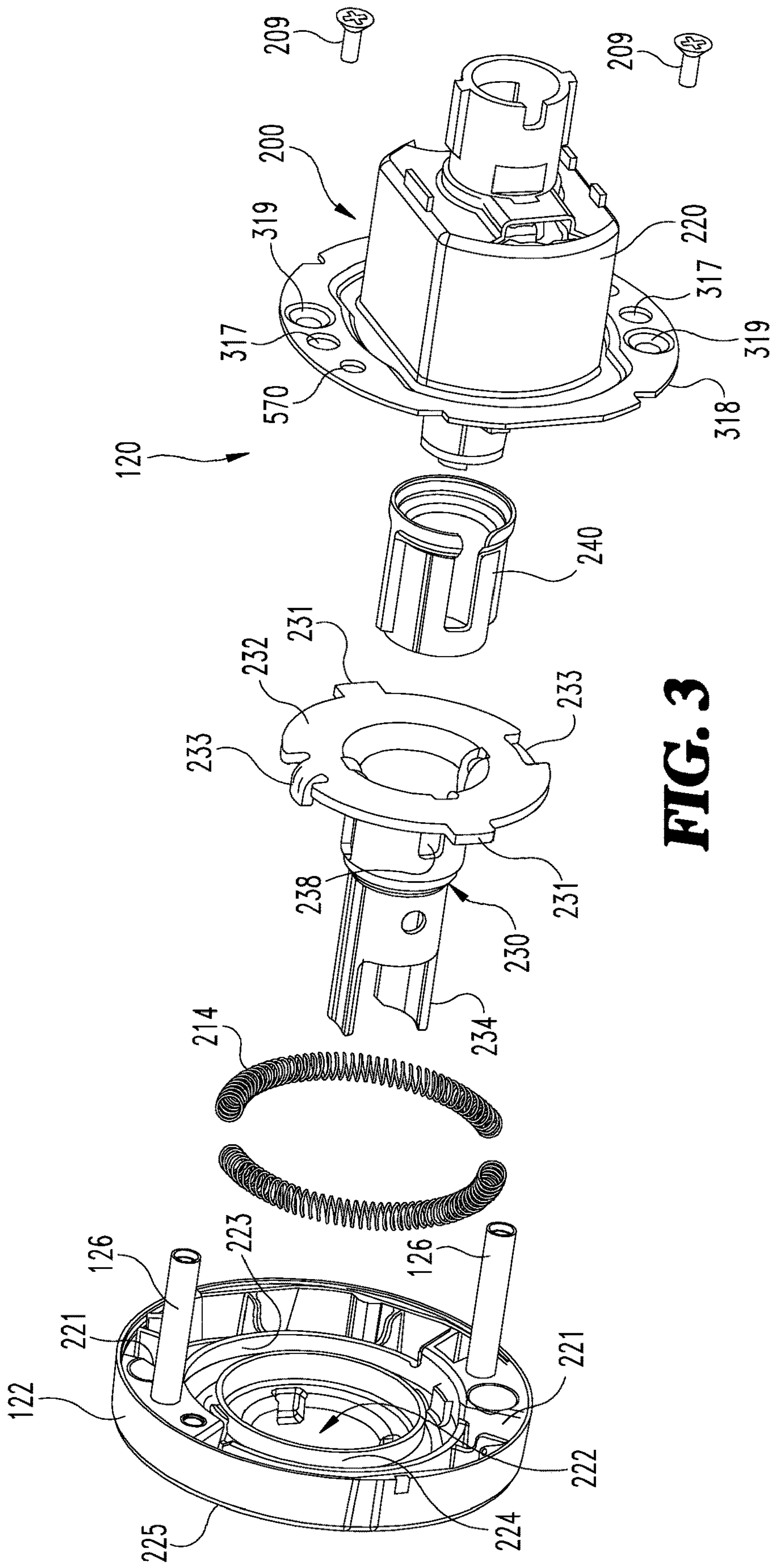
FIG. 3 is another exploded perspective view of portions of the lock assembly of FIG. 1.
Figure 4A:
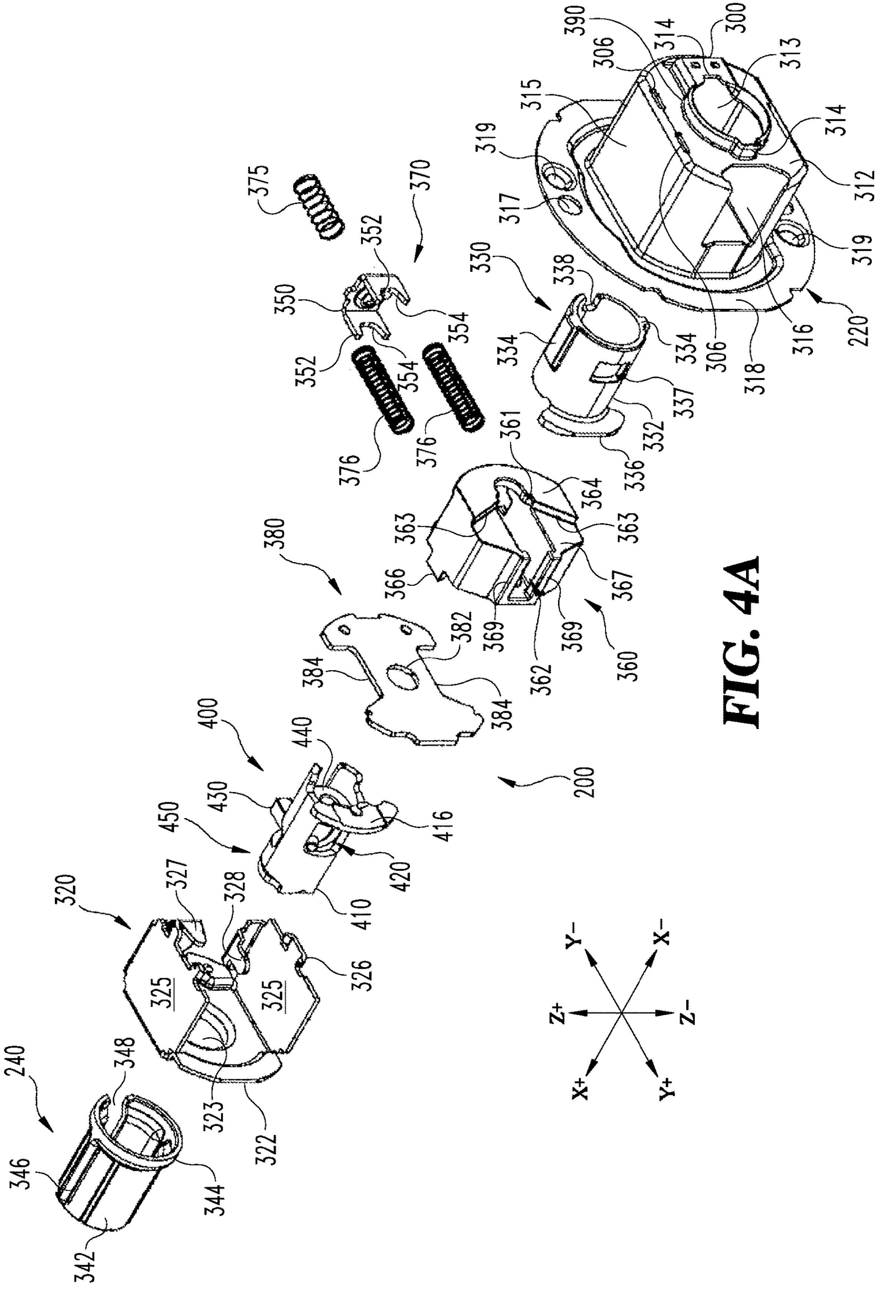
FIG. 4A is another exploded perspective view of portions of the lock assembly of FIG. 1.
Figure 4B:
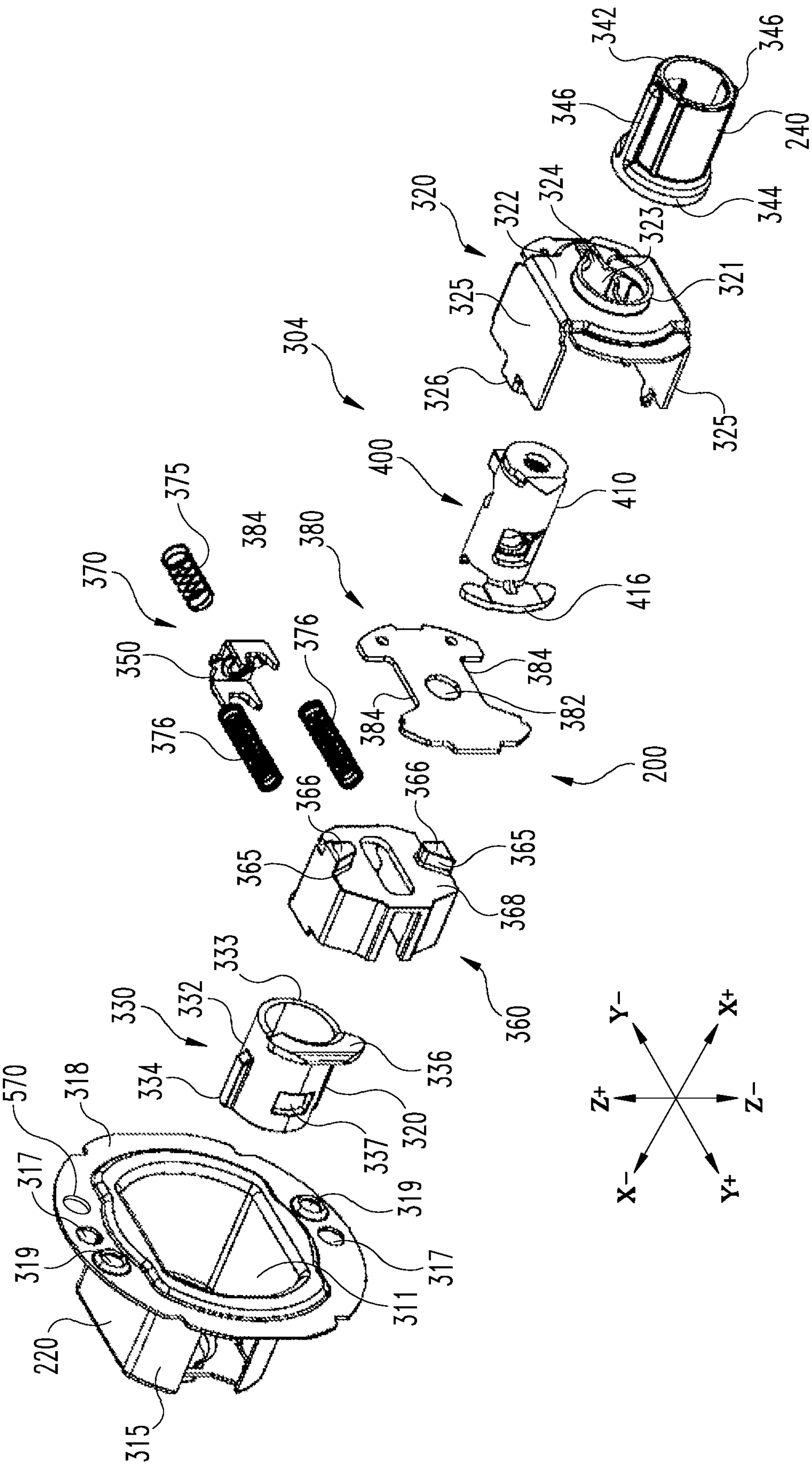
FIG. 4B is another exploded perspective view of FIG. 4A.

With reference to FIG. 3, illustrated therein is an example of a chassis sub-assembly 200 positioned in a sub-assembly housing 220 and may be utilized as the chassis assembly 140 in certain embodiments of the lock assembly 100. A biasing mechanism 214 is engaged with the outer housing 122 and the outside lever spindle 230. It is also contemplated that the biasing mechanism 214 may be provided in another form, such as in the form of one or more torsion springs. The outer housing 122 has an aperture 222 formed through an inner wall 223 and an outer wall 225, which is configured to receive and rotatably support a spindle shaft 234 of the outside lever spindle 230. The outer housing 122 includes an annular channel 224 in which the biasing mechanism 214 is received.

The outside lever spindle 230 includes a tubular spindle shaft portion 234 extending proximally from the spindle base 232. With the outside lever spindle 230 mounted to the outer housing 122, the spindle base 232 retains the biasing mechanism 214 in the annular channel 224, and a pair of tabs 233 project into the annular channel 224 to provide anchor points for the biasing mechanism 214 during rotation of the outside lever spindle 230. Additionally, the tubular spindle shaft portion 234 extends through the aperture 222 and is rotatably supported through the inner and outer walls 223, 225. When so mounted, the outside lever spindle 230 is at least selectively rotatable between a home position and at least one rotated position, and is biased toward its home position by the biasing mechanism 214. Additionally, the outside drive assembly 120 limits the outside lever spindle 230 to rotation between a first terminal position and a second terminal position. For example, the spindle shaft 232 may include a pair of stop arms 231, and the housing 220 may include a set of stop walls 221 that engage the stop arms 231 and prevent rotation of the outside lever spindle 230 beyond its terminal positions. In the illustrated embodiment, the outside lever spindle 230 is operable to rotate from its home position through an angle of about 60° in either direction. In other words, each of the terminal positions is offset from the home position by about sixty degrees (60°). Other angles of rotation are contemplated herein. A handle catch 216 (FIG. 2) is seated with the tubular spindle shaft portion 232, and is configured to selectively longitudinally couple the outside handle 104 with the outside lever spindle 230.

Referring to FIGS. 4A, 4B, 5A and 5B, the chassis sub-assembly 200 includes a plurality of working components 304 movably mounted to the sub-assembly housing 220. In the illustrated form, the chassis sub-assembly 200 includes a bracket 320 mounted in the sub-assembly housing 220, an inside chassis spindle 330, a key cam sleeve 240, a plunger catch 350, a retractor or shuttle 360, a biasing assembly 370, and a key cam 400. The key cam 400 is shown in an exploded view in FIGS. 5A and 5B. The inside chassis spindle 330 is rotatably mounted to the sub-assembly housing 220, and the key cam sleeve 240 is rotatably mounted to the bracket 320. The shuttle 360 is slidably mounted between the inside spindle 330 and the key cam 400, and the plunger catch 350 is movably mounted to the shuttle 360. The biasing assembly 370 is engaged with the bracket 320, the plunger catch 350, and the shuttle 360. The biasing assembly 370 biases the plunger catch 350 and the shuttle 360 in the laterally outward extending direction (Y+). The chassis 200 may further include a fire plate 380, which in the illustrated form is sandwiched between the key cam 400 and the shuttle 360.

The key cam 400 generally includes a shell 410, a plug 420 movably mounted in the shell 410, a lock control lug 430 mounted in the shell 410 and supported by the plug 420, and a stem 440 movably seated in the shell 410. The key cam 400 also includes a cam mechanism 450 configured to translate relative rotational movement of the plug 420 and stem 440 into relative longitudinal movement of the plug 420 and stem 440, and a biasing member in the form of a spring 403 urging the lug 430 in the distal direction (X−).

The sub-assembly housing 220 defines a chamber 311, which is partially delimited by a distal wall 312. The distal wall 312 includes an opening 313 that is generally circular, and which includes a pair of recesses 314 extending radially outwardly from opposite sides of the circular portion. The housing 220 also includes a body portion 315 that partially defines the chamber 311, and which includes a side opening 316 in communication with the chamber 311. A flange 318 is formed at a proximal end of the body portion 315, and a mounting bracket 390 may be formed on the distal wall 312. The flange 318 includes a pair of mounting post openings 317 aligned with the mounting posts 126 extending from the outer spring cage housing 122 (see FIG. 2). The flange 318 also includes a pair of fastener openings 319 aligned such that a pair of fastener screws 209 extend through the openings 319 to secure the chassis sub-assembly housing 220 to the outer spring cage housing 122.

The bracket 320 includes a proximal wall 322 including a generally circular opening 323 that is partially defined by a C-shaped wall 321, which extends in the proximal direction (X+) from the proximal wall 322. The proximal wall 322 also includes a slot 324 that extends radially outward from the circular opening 323, and which is aligned with the open side of the C-shaped wall 321. The bracket 320 also includes a pair of sidewalls 325 that extend from the proximal wall 322 in the distal direction (X−), and which terminate in a set of tabs 326. Each of the tabs 326 is configured to be received in a corresponding slot 306 formed in the distal wall 312 of the sub-assembly housing 220 to align and secure the bracket 320 and the sub-assembly housing 220. The bracket 320 also includes a center anchor post 327 and a pair of side anchor posts 328. Each of the anchor posts 327, 328 provides an anchor point for a biasing assembly 370 which will be described in more detail below.

The inside chassis spindle 330 includes a tubular body portion 332, the proximal end portion 333 of which is substantially circular in cross-section, and the distal end portion of which includes a pair of external splines 334. The proximal end portion 333 is sized and configured to be received in and rotatably supported by the circular portion of the distal opening 313 of the sub-assembly housing 220, and the splines 334 are sized and configured to be received in the recesses 314 during assembly of the sub-assembly chassis 200. The inside spindle chassis 330 also includes an ear 336, which is formed at the proximal end 333 of the body portion 332, and which is configured to engage the shuttle 360 in a manner described in further detail below. The spindle 330 further includes a coupling slot 337 and an alignment notch 338, which may facilitate installation of one or more components to the sub-assembly chassis 200.

The key cam sleeve 240 includes a tubular body portion 342 having a collar 344 formed at a distal end thereof. The collar 344 is configured to receive the C-shaped wall 321 of the bracket 320. While other forms of engagement are contemplated, the illustrated key cam sleeve 240 includes a pair of external splines 346 configured to be received in the outside lever spindle 230 to rotationally couple the key cam sleeve 240 with the drive spindle 230.

The plunger catch 350 is slidably mounted in the shuttle 360 and is movable relative to the shuttle 360 in the lateral directions (Y+, Y−). The plunger catch 350 includes a pair of longitudinally-spaced catch arms 352, each of which includes a notch 354. As described in further detail below, the plunger catch 350 is operable to selectively retain certain configurations of the lock assembly 100 in a locked state.

The shuttle 360 is slidably mounted within the bracket 320, and is laterally movable between an extended or laterally outward position and a retracted or laterally inward position. An opening 361 extends through the longitudinal dimension of the shuttle 360, and facilitates interaction between components positioned on opposite sides of the shuttle 360. The shuttle 360 also includes a slot 362 that is formed on a laterally-outward side thereof, and which is generally aligned with the side opening 316 of the sub-assembly housing 220. The slot 362 is configured to receive a portion of the latchbolt mechanism 150, and is defined in part by a pair of longitudinally-extending lips 369. The lips 369 are configured to engage the latchbolt 154 as it retracts in response to movement of the shuttle 360 in the laterally-inward direction (Y−).

The shuttle 360 also includes a set of ramps configured to cause laterally-inward movement in response to rotation of the key cam shell 410. A pair of distal ramps 363 are formed on a distal protrusion 364, which projects distally beyond a distal face 367 of the shuttle 360. With the chassis 300 assembled, the ear 336 of the inside chassis spindle 330 abuts the distal face 367, and each ramp 363 is adjacent an edge of the ear 336. The distal ramps 363 are configured to engage the ear 336 such that rotation of the spindle 330 from the home position in either direction is operable to move the shuttle 360 toward its retracted position. Similarly, a pair of proximal ramps 365 are formed on a pair of proximal protrusions 366, which project proximally beyond a proximal face 368 of the shuttle 360. The proximal ramps 365 are configured to engage an ear 416 of the key cam shell 410 such that rotation of the shell 410 from the home position in either rotational direction drives the shuttle 360 toward its retracted position.

The biasing assembly 370 includes a catch spring 375 engaged with the plunger catch 350, and a pair of shuttle springs 376 engaged with the shuttle 360. The catch spring 375 biases the plunger catch 350 in the laterally outward direction (Y+) toward the extended position thereof. Each of the shuttle springs 376 bias the shuttle 360 in the laterally outward direction (Y+) toward the extended position thereof.

The fire plate 380 includes a central opening 382 and a pair of recesses 384 that are defined by an outer edge of the fire plate 380. With the chassis 200 assembled, the proximal side of the fire plate 380 abuts the ear 416 of the key cam shell 410, and the distal side of the fire plate 380 abuts the proximal face 368 of the shuttle 360. The proximal protrusions 366 extend through the recesses 384 such that the proximal ramps 365 are operable to engage the ear 416 of the key cam shell 410. The recesses 384 are sized and shaped such that the edges of the fire plate 380 do not interfere with the protrusions 366 as the shuttle 360 moves between its extended and retracted positions. Additionally, the opening 382 provides a path through which one or more components may extend to facilitate interaction between the key cam 400 and components on the opposite side of the fire plate 380.

Figure 5A:
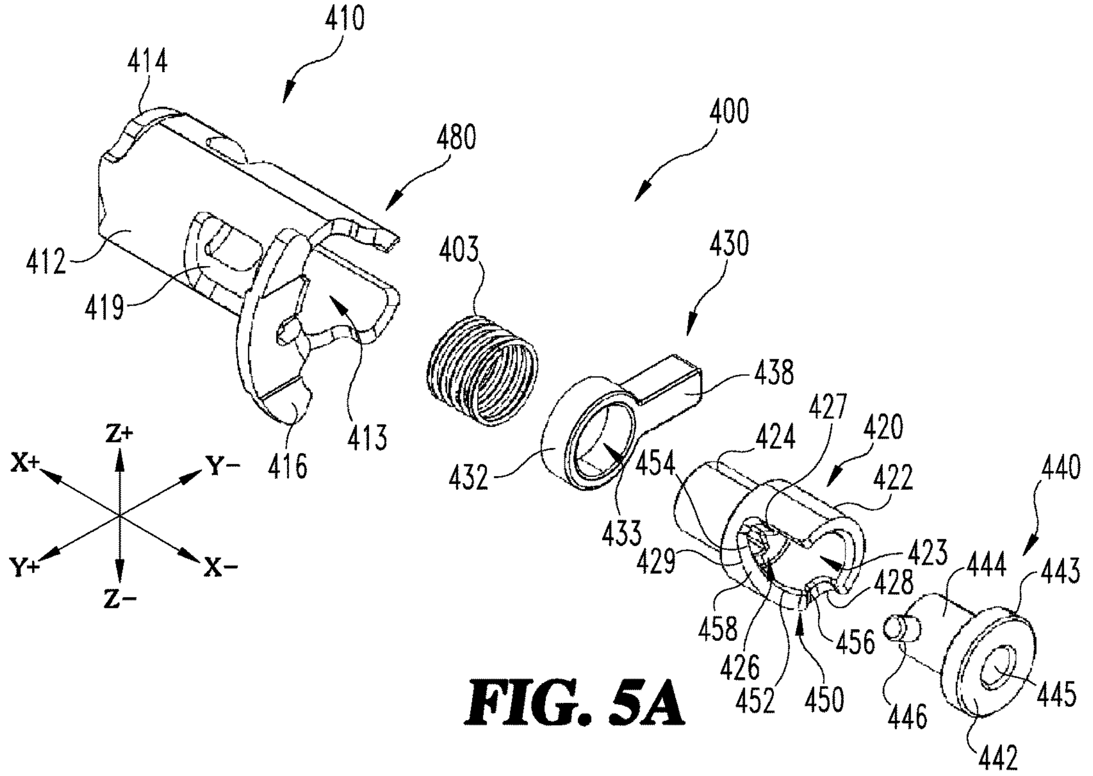
FIG. 5A is another exploded perspective view of a key cam of the lock assembly of FIG. 1.
Figure 5B:
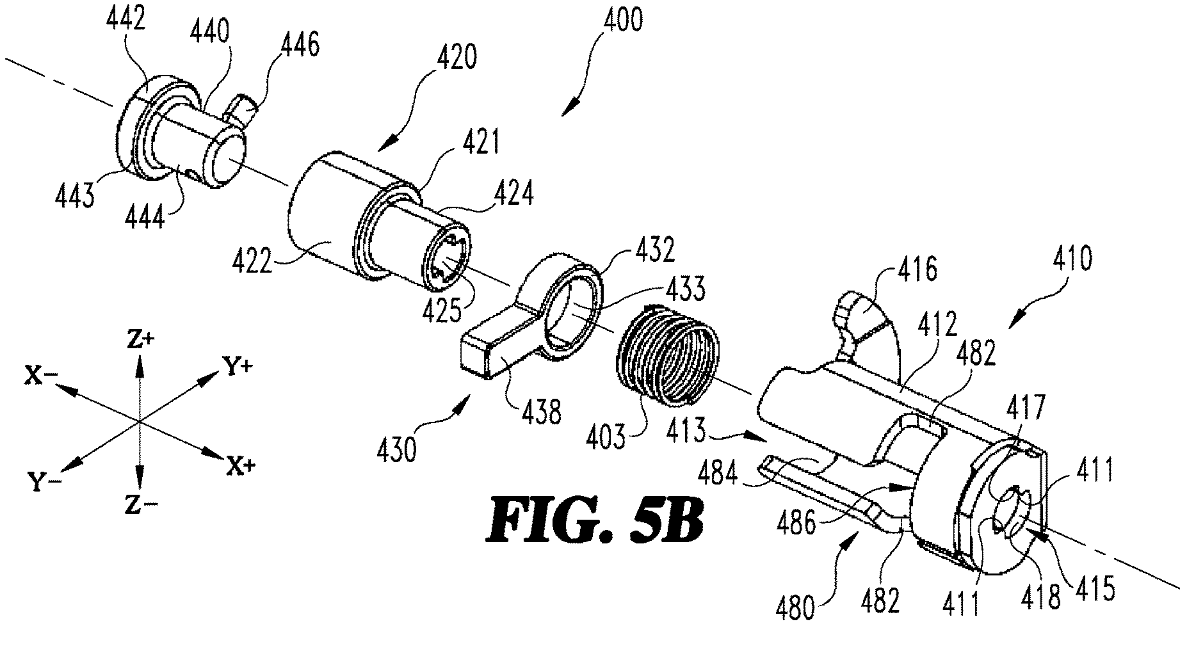
FIG. 5B is another exploded perspective view of FIG. 5A.

With reference to FIGS. 5A and 5B, the key cam shell 410 includes a tubular body portion 412 defining a chamber 413, a proximal wall 414 having a bowtie opening 415 connected with the chamber 413, and a distal ear 416 configured to engage the proximal ramps 365 of the shuttle 360 in the manner described above. The bowtie opening 415 has a generally circular portion, and is defined in part by a pair of teeth 411 that project radially inward and define engagement surfaces. The bowtie opening 415 has a minor diameter 417 defined between the teeth 411, and a major diameter 418 defined by the generally circular portion.

The body portion 412 defines a pin opening 419 and a lug opening 480, each of which is in communication with the chamber 413. The lug opening 480 is substantially T-shaped, and includes a partial circumferential slot or arc slot 482 that subtends a predetermined angle about the rotational axis of the body portion 412, and a longitudinal slot 484 that extends from the distal end of the body portion 412 to the arc slot 482. The arc slot 482 and the longitudinal slot 484 intersect one another at an intersection 486, and each of the arc slot 482 and longitudinal slot 484 may be considered to include the intersection 486. Each of the slots 482, 484 further includes at least one slot portion connected with the intersection 486.

The key cam plug 420 includes a tubular body portion 422, and a post 424 that extends from the body portion 422 in the proximal direction (X+). The body portion 422 defines a chamber 423, and the post 424 defines a bowtie opening 425 in communication with the chamber 423. The body portion 422 has a greater diameter than the post 424, such that a shoulder 421 is formed at a proximal end of the body portion 422. The body portion 422 also defines a pin opening 426 that is in communication with the chamber 423, and which is partially delimited by a first longitudinally-extending edge 427, a second longitudinally-extending edge 428, and a distal-facing edge 429 extending between the longitudinal edges 427, 428.

The lock control lug 430 includes an annular portion 432 and a locking arm 438 extending radially outward from the annular portion 432. The annular portion 432 defines an opening 433 sized and configured to receive the plug post 424, on which the lock control lug 430 is movably mounted. A biasing member in the form of a spring 403 is engaged between the key cam shell proximal wall 414 and the annular portion 432, thereby biasing the lug 430 in the distal direction (X−) and into engagement with the shoulder 421 of the plug 420. As a result, the spring 403 also biases the plug 420 in the distal direction (X−).

The locking arm 438 is sized and configured to extend through the lug opening 480, which allows for limited relative movement of the shell 410 and the lug 430. More specifically, relative rotational movement is enabled when the arm 438 is received in the arc slot 482, and relative longitudinal movement is enabled when the arm 438 is received in the longitudinal slot 484. Thus, when the arm 438 is positioned in the intersection 486, both relative longitudinal movement and relative rotation are permitted.

The key cam stem 440 includes a body portion 442, which includes a base 443, a post 444 extending from the base 443 in the proximal direction (X+), and a cavity 445 that extends through the base 443 and into the post 444. The post 444 is sized and shaped to be received in the chamber 423 of the plug 420 such that the body portion 422 supports the stem 440 for sliding and rotational movement. Additionally, the base 443 is configured to abut the distal end of the plug 420 to limit relative longitudinal movement of the plug 420 and the stem 440. The stem 440 also includes a cam rider in the form of a pin 446, which is mounted on the post 444 and extends radially outwardly into the pin openings 419, 426 of the shell 410 and plug 420.

The cam mechanism 450 includes a cam surface 452 defined by the distal-facing edge 429 of the plug 420, and may be considered to further include the pin 446 of the stem 440. The cam surface 452 includes a proximal landing 454 adjacent the first sidewall 427, a distal landing 456 adjacent the second sidewall 428, and a helical ramp 458 extending between and connecting the proximal landing 454 and the distal landing 456. The proximal landing 454 is configured to receive or engage the pin 446 when the base 443 of the stem 440 is in abutment with the distal end of the plug 420. The distal landing 456 is likewise configured to receive or engage the pin 446, and is defined in part by a minor ramp 457 that extends distally from the apex of the helical ramp 458. The helical ramp 458 is configured to engage the pin 446 to effect relative longitudinal movement of the plug 420 and the stem 440 in response to relative rotational movement of the plug 420 and the stem 440.

Figure 6A:
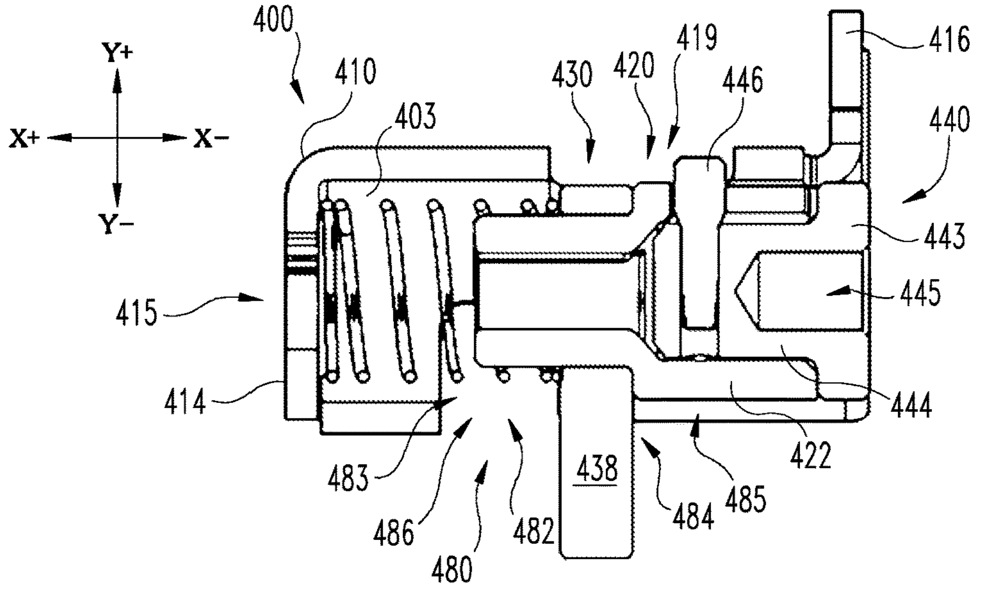
FIG. 6A is a cross-sectional view of another portion of the lock assembly in an unlocking state.

With additional reference to FIG. 6A, the key cam 400 is assembled in an unlocking state, in which the lug 430 is in an unlocking position. With the lug 430 in the unlocking position, the arm 438 is received in the longitudinal slot portion 485. As such, the shell 410 and the lug 430 are rotationally coupled with one another, and the lug 430 is capable of moving proximally (X+) toward a locking position in which the arm 438 is received in the intersection 486. The illustrated key cam 400 is configured to move the lug 430 between the locking and unlocking positions in response to relative rotation of the plug 420 and the stem 440.

With the key cam 400 in its unlocking state, the pin 446 of the stem 440 is positioned at the proximal landing 454 of the cam surface 452. Accordingly, the proximal landing 454 may alternatively be referred to as the unlocking landing 454. With the pin 446 so positioned, relative rotation of the plug 420 and the stem 440 in a locking direction causes the pin 446 to travel along the helical ramp 458, thereby urging the plug 420 in the proximal locking direction (X+). As the lug 430 approaches the locking position, the pin 446 comes into contact with the distal landing 456, which holds the lug 430 in the locking position against the biasing force of the spring 403. Accordingly, the distal landing 456 may alternatively be referred to as the locking landing 456. With the pin 446 engaged with the distal landing 456, the minor ramp 457 serves to discourage relative rotation of the plug 420 and the stem 440 in an unlocking direction.

With the key cam 400 in its locking state, relative rotation of the plug 420 and the stem 440 causes the pin 446 to travel along the minor ramp 457 and into engagement with the helical ramp 458. The biasing force of the spring 403 urges the lug 430 toward its unlocking position, which in turn drives the plug 420 in the distal direction (X−). As the plug 420 moves in the distal direction (X−), engagement between the helical ramp 458 and the pin 446 causes a corresponding rotation of the plug 420. When the lug 430 reaches the unlocking position, the pin 446 is once again engaged with the proximal landing 454, and the key cam 400 is in its unlocking state.

As is evident from the foregoing, the illustrated key cam 400 can be transitioned between the locking state and the unlocking state by causing relative rotation of the plug 420 and the stem 440. An example of a component that may be utilized to effect such relative rotation is described below with reference to FIG. 9*b*. The illustrated key cam 400 is also capable of being moved between its locking and unlocking states by longitudinally moving the stem 440 relative to the shell 410. For example, the key cam 400 may be transitioned from the unlocking state to the locking state by exerting a proximal pushing force on the stem 440, thereby causing the plug 420 to drive the lug 430 to the locking position. When the proximal pushing force is removed to enable movement of the stem 440 in the distal direction (X−), the biasing force of the spring 403 returns the plug 420 and lug 430 to the positions illustrated in FIG. 6A, thereby returning the key cam 400 to the unlocking state.

Figure 6B:
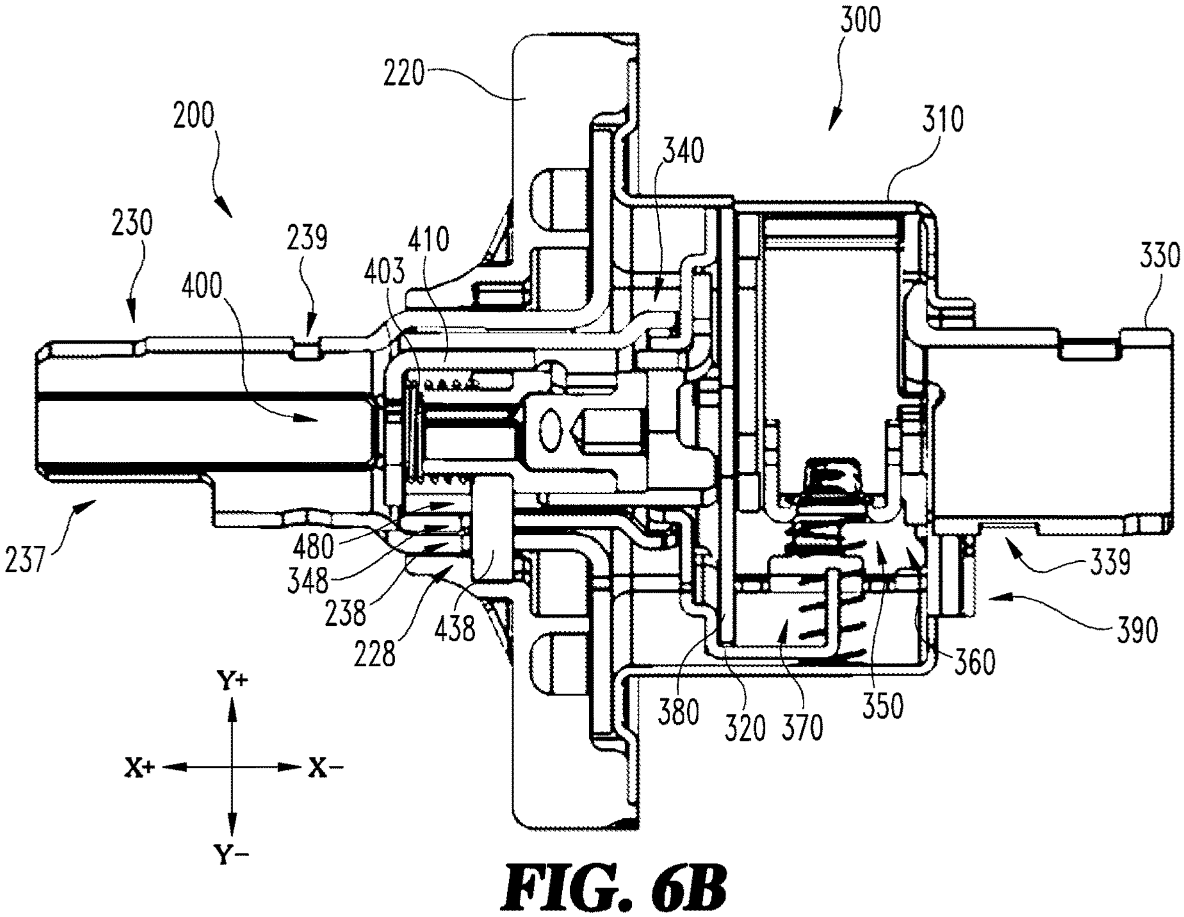
FIG. 6B is a cross-sectional view of another portion of the lock assembly in a locking state.

With additional reference to FIG. 6B, when the chassis assembly 200 is assembled, the lock control lug arm 438 extends into the receiving slot 238 of the outside drive spindle 230 via the receiving slot 348 of the key cam sleeve 240. When the lug 430 is in its unlocking position (FIG. 6A), the arm 438 extends into the receiving slots 238, 348 via the longitudinal slot portion 485, thereby rotationally coupling the key cam shell 410 with the outside spindle 230 and key cam sleeve 240. As a result, a handle mounted to the outside drive spindle 230 is capable of rotating the rotationally coupled components (i.e., the outside drive spindle 230, the key cam sleeve 240, and the key cam shell 410) to retract the shuttle 360. The outside handle is therefore unlocked, and is capable of retracting the latchbolt.

When the lug 430 is in its locking position (FIG. 6B), the lock control lug arm 438 extends into the receiving slots 238, 348 through the intersection 486 of the lug opening 480, and the arc slot 482 permits relative rotation of the key cam shell 410 and the rotationally coupled outside spindle 230 and key cam sleeve 240. As a result, the outside spindle 230 and key cam sleeve 240 are rotationally decoupled from the key cam shell 410, and therefore cannot rotate the shell 410 to drive the shuttle 360. The outside handle 104 is therefore locked, and is not operable to retract the latchbolt 154.

In the illustrated form, the length of the lock control lug arm 438 is sufficient to extend through the receiving slots 238, 348 and project beyond the radially outer surface of the outside drive spindle 230. Additionally, when the spindle 230 and key cam sleeve 240 are in the home position, the receiving slots 238, 348 are aligned with the locking slot 228 of the outside housing 220. When the key cam 400 is in its locking state, the arm 438 extends into the locking slot 228 through the receiving slots 238, 348, thereby rotationally coupling the outside spindle 230 and key cam sleeve 240 with the outside housing 220. As a result, the outside handle 104 is locked stationary, and is prevented from retracting the latchbolt 154.

Figure 7B:
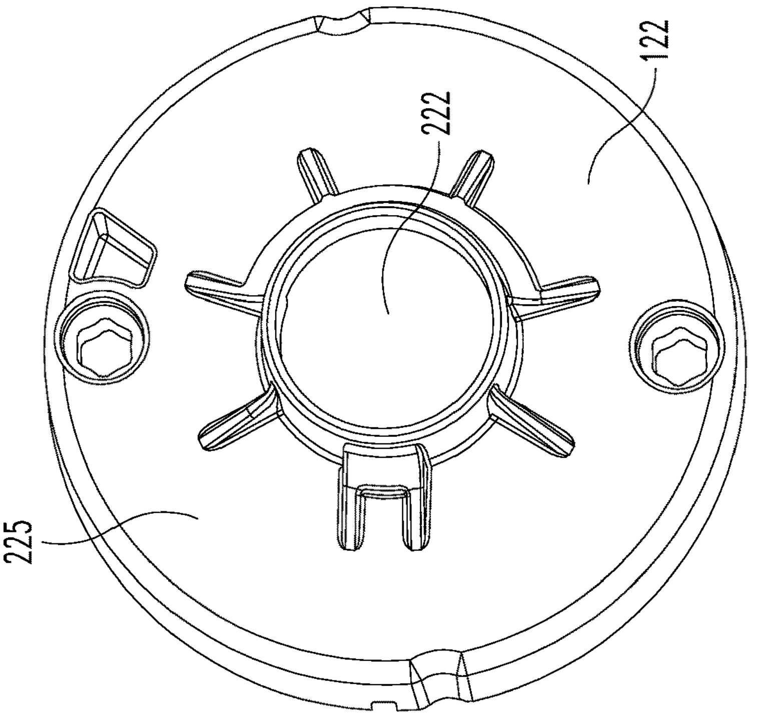
FIG. 7B is a front plan view of the outer spring cage housing of FIG. 7A.
Figure 7A:
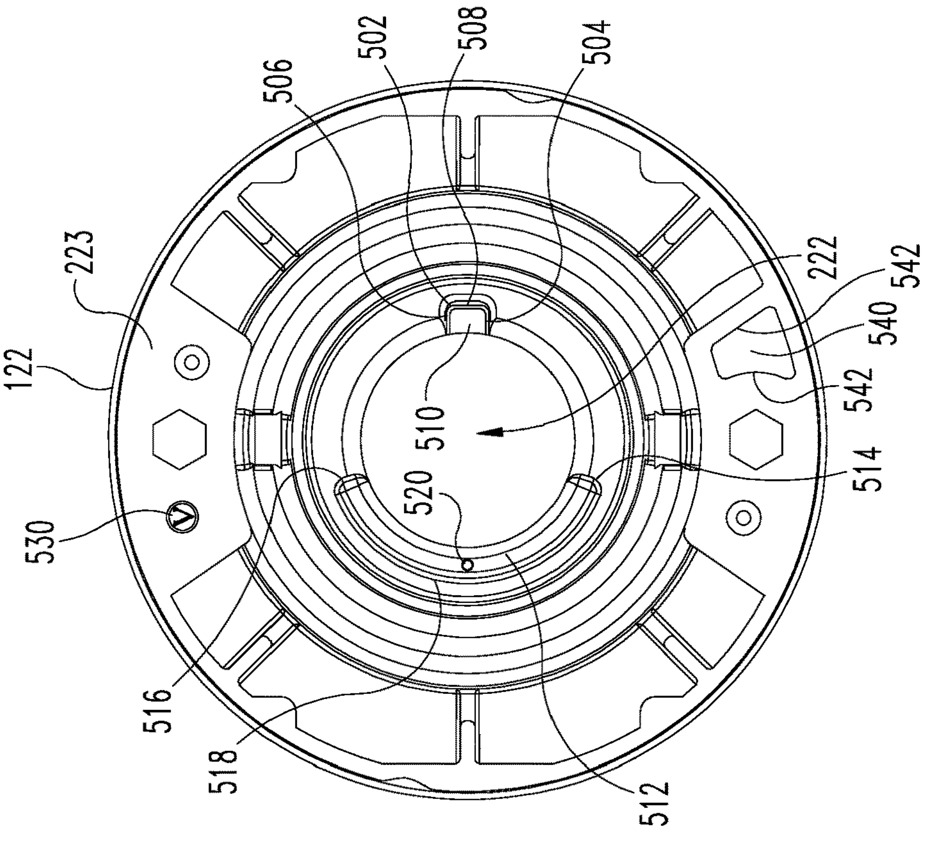
FIG. 7A is a back plan view of an outer spring cage housing.

Referring now to FIGS. 7A and 7B, a back view and a front view of the outer spring cage housing 122 are shown, respectively. Referring in particular to FIG. 7A, the outer spring cage housing 122 includes a notch 502 formed in the inner wall 223 thereof, adjacent to the through aperture 222 extending through the outer spring cage housing 122. The notch 502 includes a first sidewall 504, spaced apart from a second sidewall 506 with an end wall 508 extending therebetween. A length of the end wall 508 is defined by the distance between the first sidewall 504 and the second sidewall 506 and defines a width of the notch 502. The width of the notch 502 is proximately the same size as a width of the lock control lug 430 as previously described in FIGS. 5A and 5B above. A center of the notch 502 is defined by mid-point 510 which is approximately halfway between each of the sidewalls 504, 506. On the opposing side of the through aperture 222, an arcuate elongate slot 512 is formed in the inner wall 223 of the outer spring cage housing 122. The arcuate elongate slot 512 includes a first sidewall 514 spaced apart from a second sidewall 516 to define curved angular path that the outside lever handle 104 can travel in a clutched orientation when the lock assembly is in a locked state. An arcuate end wall 518 extends between the first and second sidewalls 514, 516. A mid-point 520 defines an approximate halfway point between the first and second sidewalls 514, 516 and is approximately 180 degrees away from the mid-point 510 of the notch 502. The notch 502 will prevent the lock control lug 430 (not shown) from moving when the lock assembly 100 is in the locked state to define a non-clutching orientation.

A first visual indicator 530 is located on an inner wall 223 of the outer spring cage housing 122. In the exemplary embodiment, the first visual indicator 530 is displayed as a letter "V" for indicating that the lock assembly is in a clutching orientation when the lock assembly 100 is assembled as will be described below. In the clutching orientation, the locking lug 430 engages with the arcuate elongated slot 512. A second visual indicator 540 is also positioned on the inner wall 223 of the outer spring cage housing 122. The second visual indicator 540 can be a pocket or the like that includes one or more sidewalls 542 formed therein. The second visual indicator 540 can be of any shape desired such as a circle, squared or geometric pattern. In other forms, the second visual indicator 540 can include any symbol, alpha-numeric character, or graphic as desired. Similarly, the first visual indicator 530 can also be any symbol, character, or graphic display as desired.

Figure 8A:
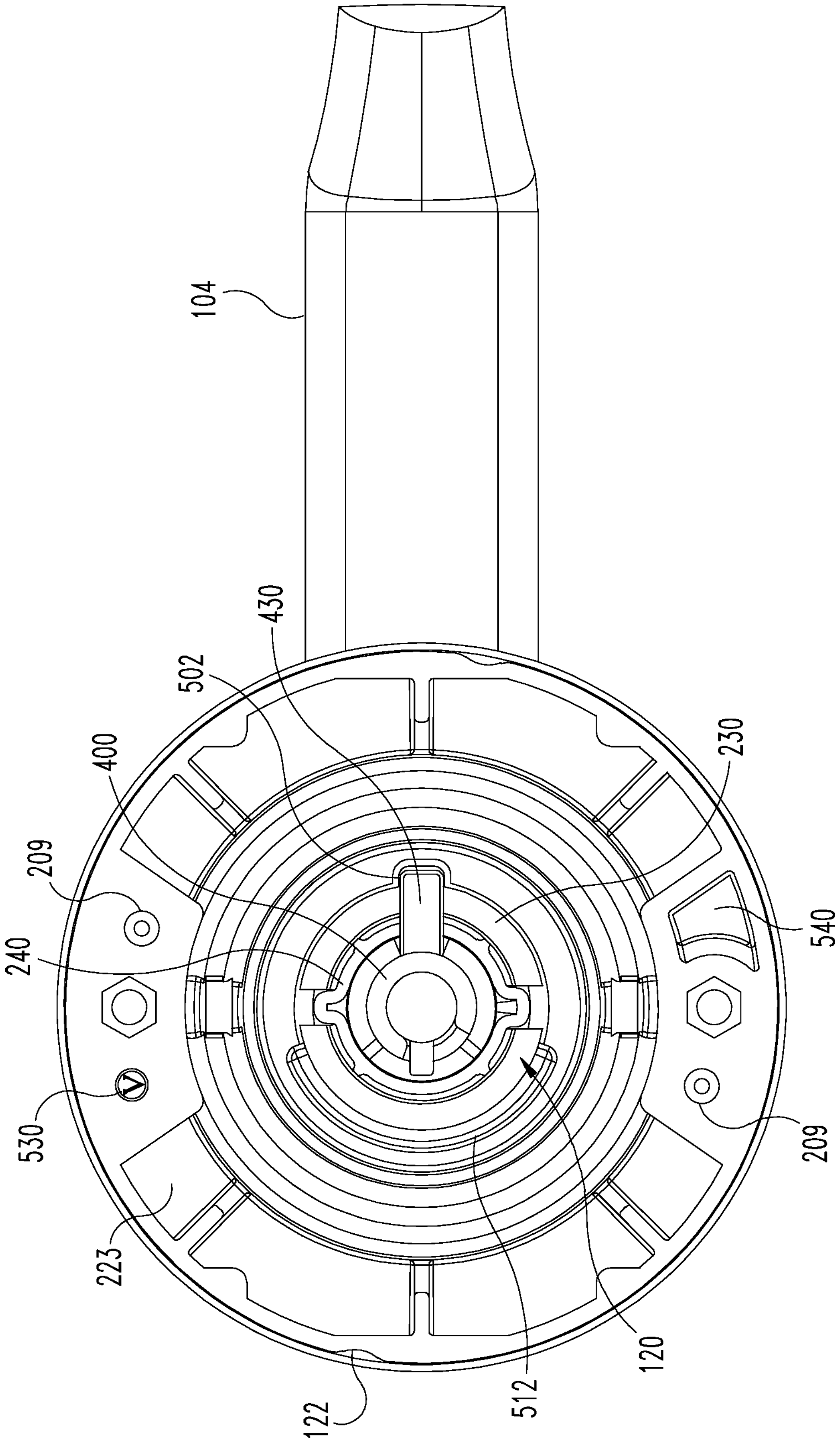
FIG. 8A is a cross-sectional plan view of the outer spring cage housing and lever handle in a non-clutching configuration.
Figure 8B:
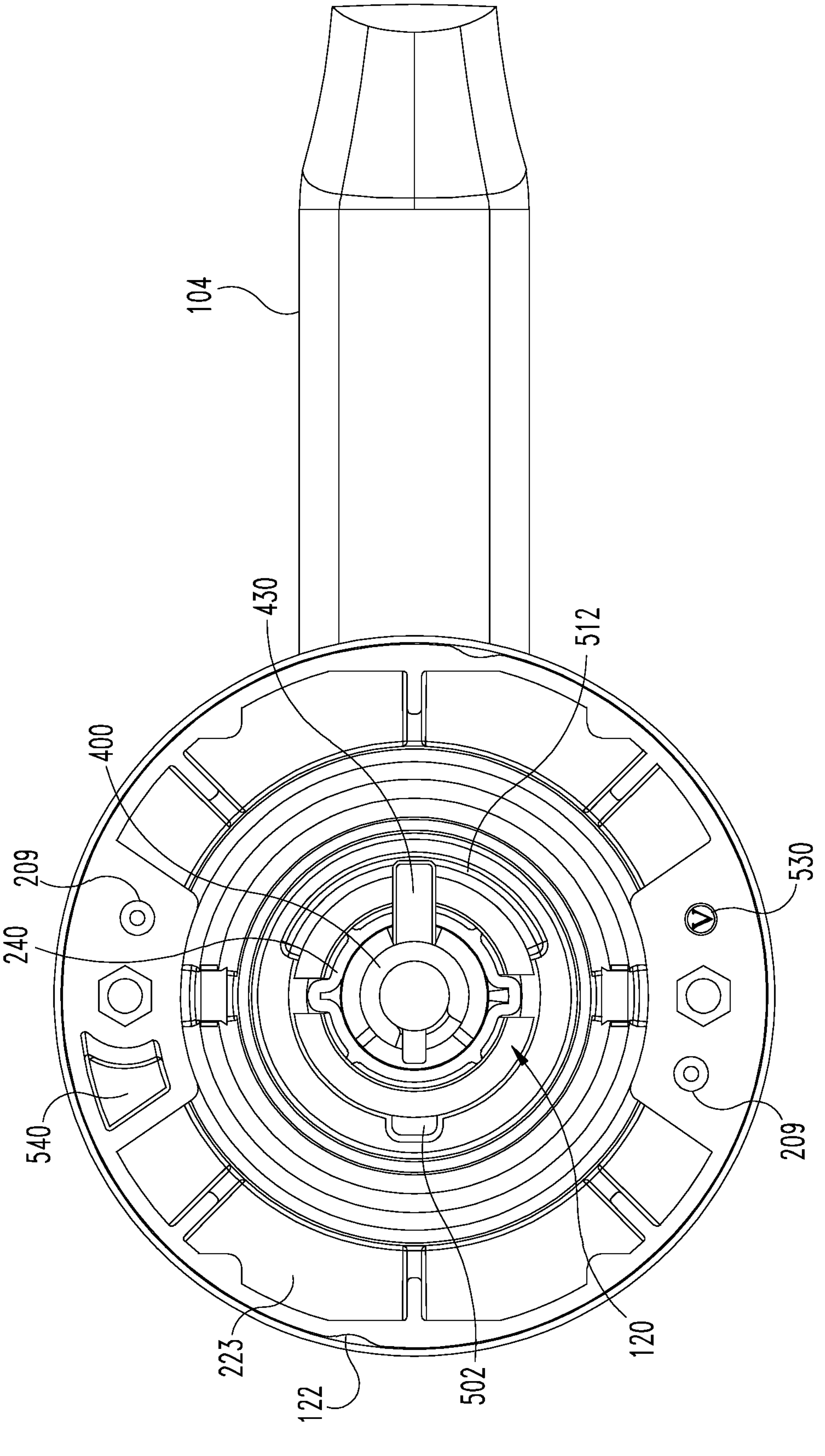
FIG. 8B is a cross-sectional plan view of the outer spring cage housing and lever handle in a clutching configuration.

Referring now to FIGS. 8A and 8B, the outside drive assembly 120 is assembled with outer spring cage housing 122 and the lever handle 104 is connected to the outside drive assembly 120. In FIG. 8A, the lock control lug 430 is positioned in the notch 502 of the outer spring cage housing 122 which defines a non-clutching orientation of the lever handle 104 and outside drive assembly 120 when the lock assembly 100 is in a locked state. In FIG. 8B, the lock control lug 430 is positioned in the arcuate elongate slot 512, which defines a clutching orientation of the lever handle 104 and outside drive assembly 120 when the lock assembly 100 is in a locked state.

Figure 9A:
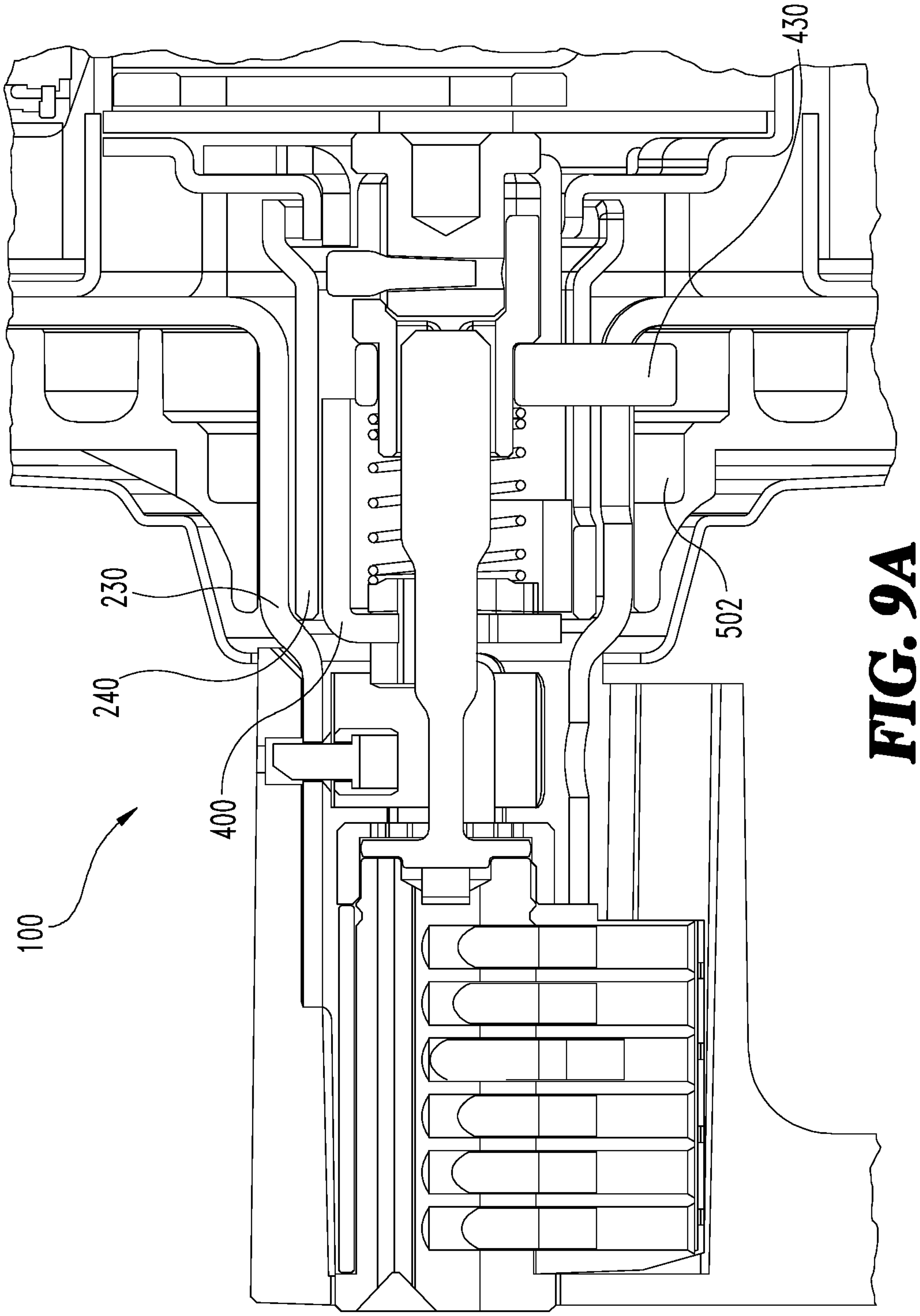
FIG. 9A is a cross-sectional view of a portion of the lock assembly of FIG. 1 in an unlocked state and a non-clutching configuration.
Figure 9B:
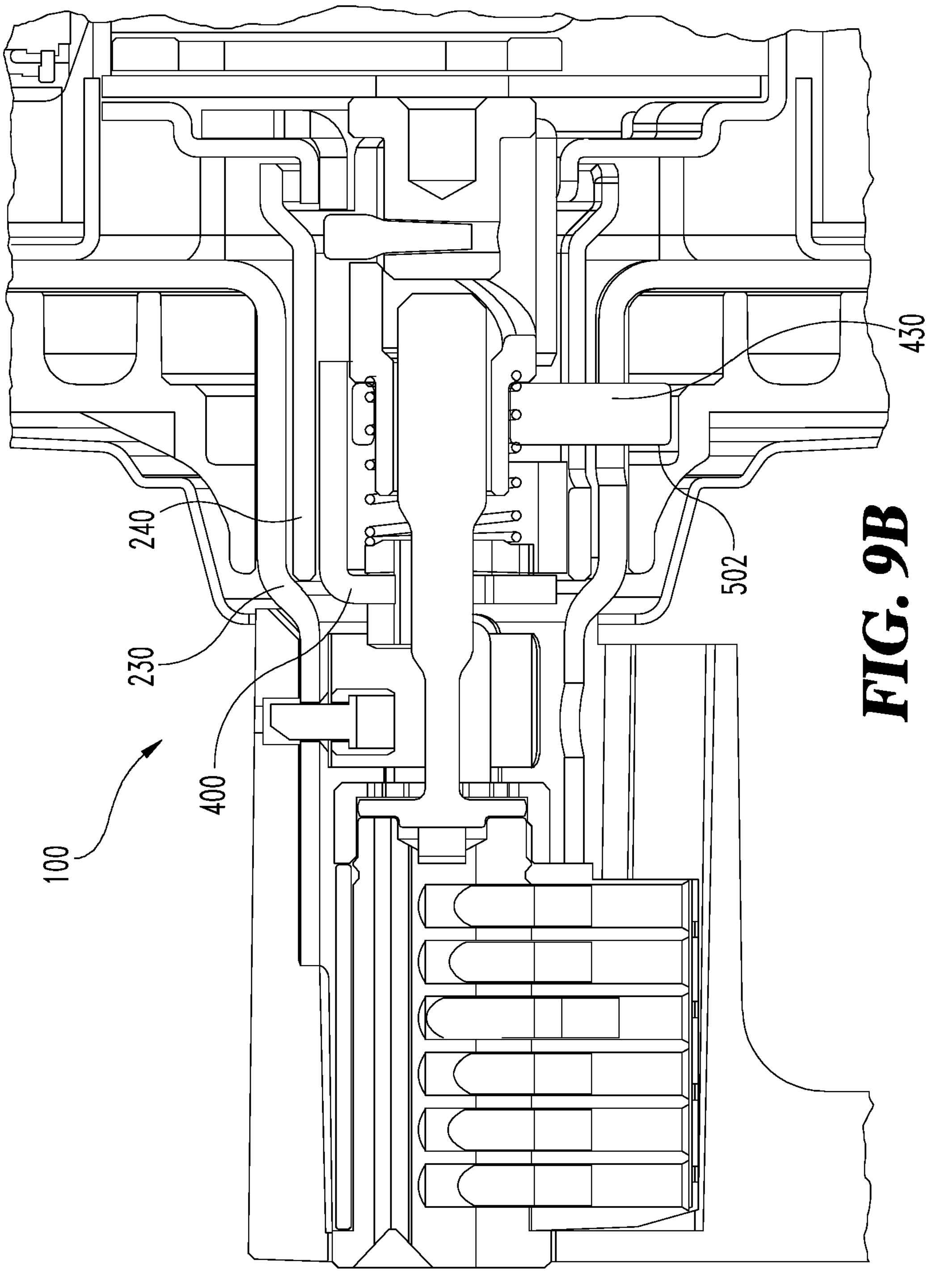
FIG. 9B is a cross-sectional view of a portion of the lock assembly of FIG. 1 in a locked state and a non-clutching configuration.

FIGS. 9A and 9B illustrate a cross-section of a portion of the cylindrical lock assembly 100. In FIG. 9A, the lock control lug 430 is not engaged with the notch 502 and the in the cylindrical lock assembly 100 is an unlocked state. In FIG. 9B, the cylindrical lock assembly 100 is in a locked state and the lock control lug 430 has been moved into the notch 502 of the outer spring cage housing 122 to place the lock assembly 100 in a non-clutching orientation.

Figure 10A:
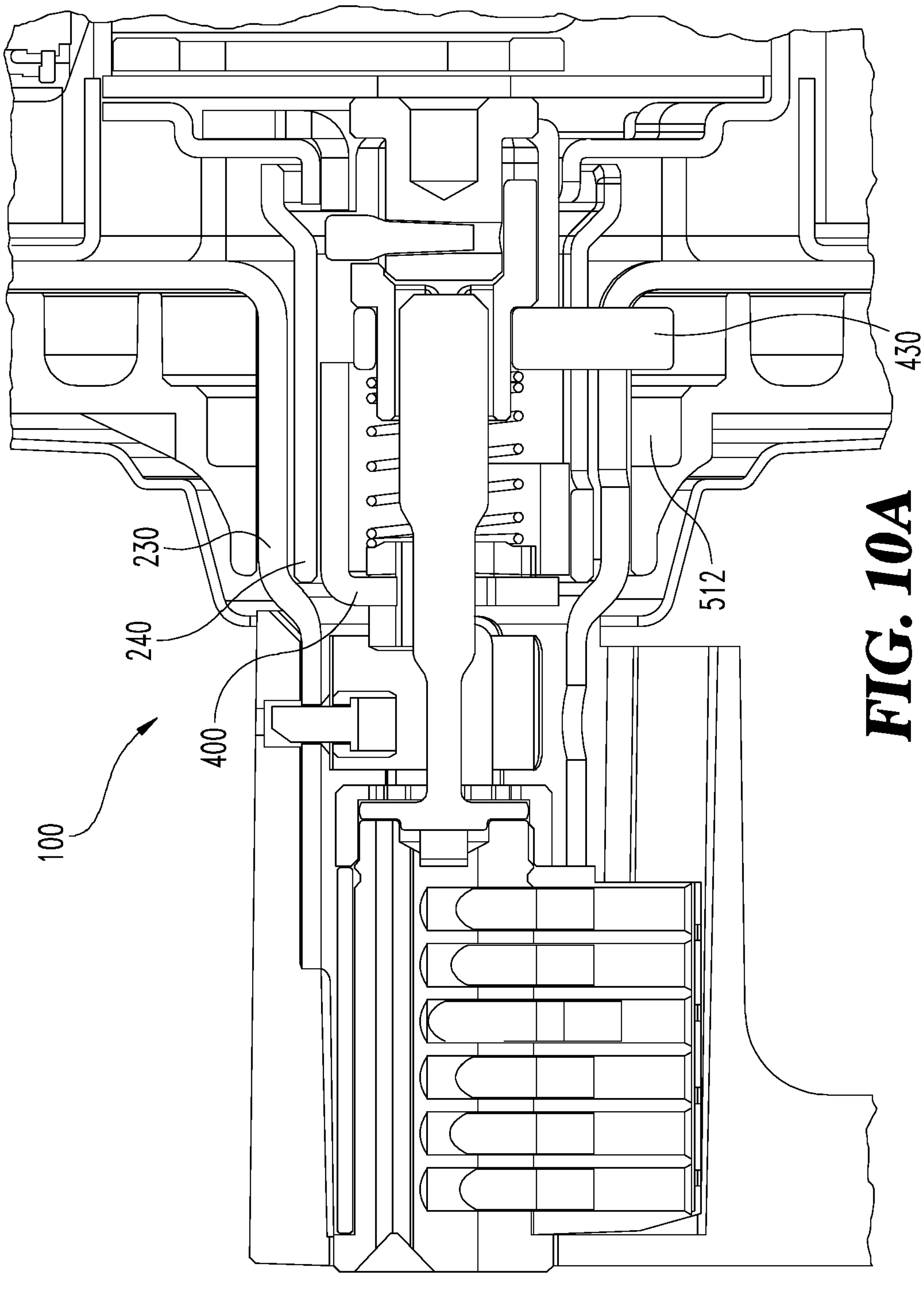
FIG. 10A is a cross-sectional view of a portion of the lock assembly of FIG. 1 in an unlocked state and a clutching configuration.
Figure 10B:
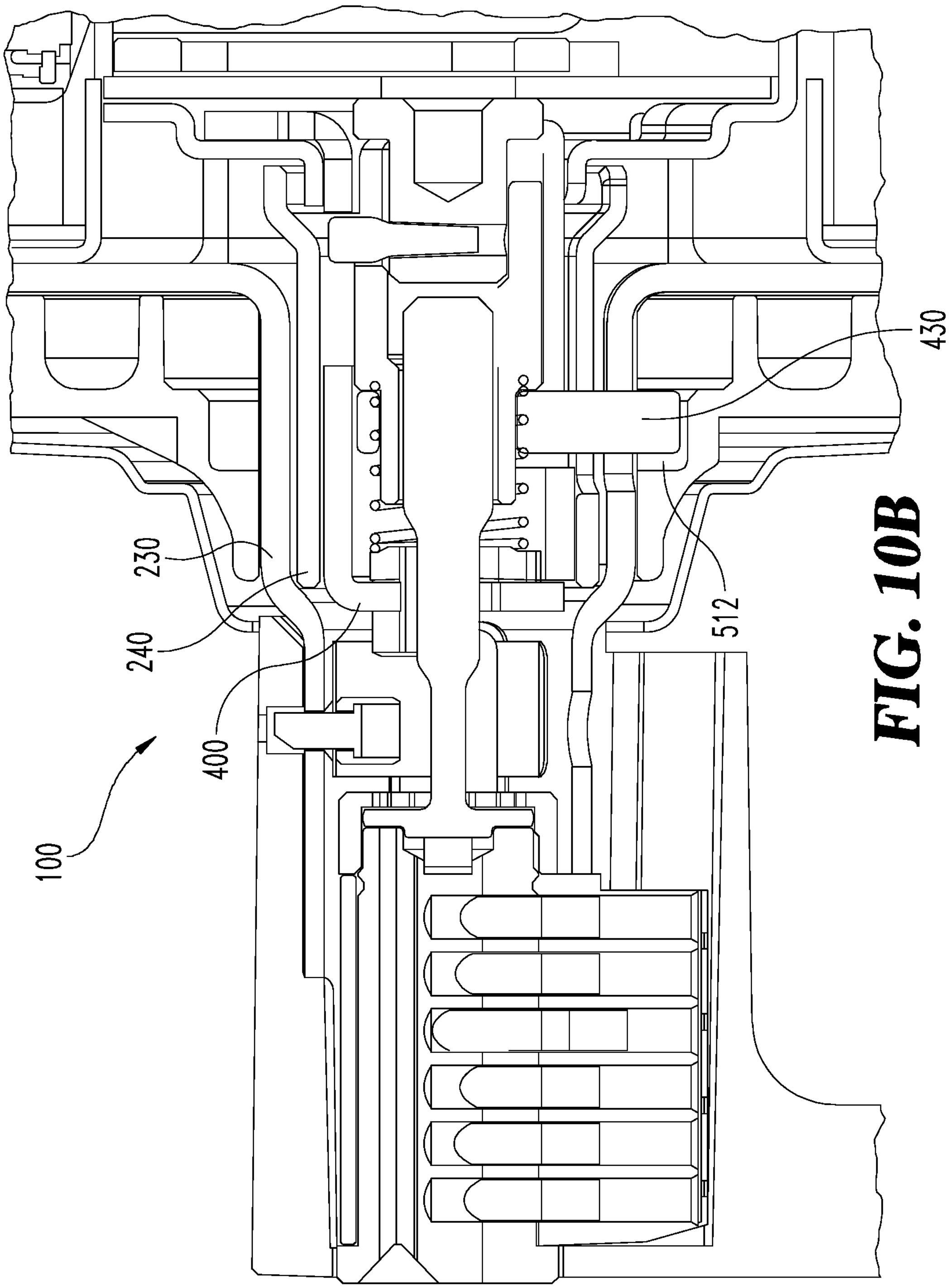
FIG. 10B is a cross-sectional view of a portion of the lock assembly of FIG. 1 in a locked state and a clutching configuration.

FIGS. 10A and 10B are shown with the outer spring cage housing 122 rotated 180 degrees relative to FIGS. 9A and 9B. In FIG. 10A, the cylindrical lock assembly 100 is in an unlocked state as the lock control lug 430 and is not positioned in the arcuate elongate slot 512. In FIG. 10B, the lock assembly 100 is in a locked state and the lock control lug 430 is positioned in the arcuate elongate slot 512, to place the lock assembly 100 in a clutching orientation.

Figure 11B:
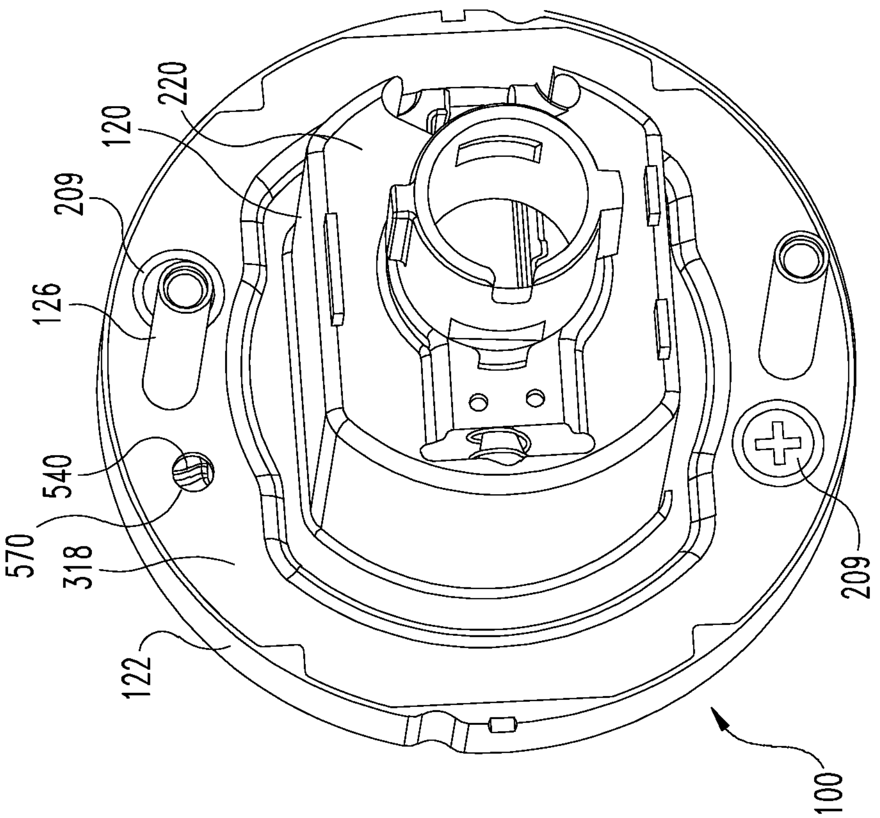
FIG. 11B is a perspective view of a portion of the lock assembly of FIG. 1 with a visual indicator that defines a non-clutching configuration.
Figure 11A:
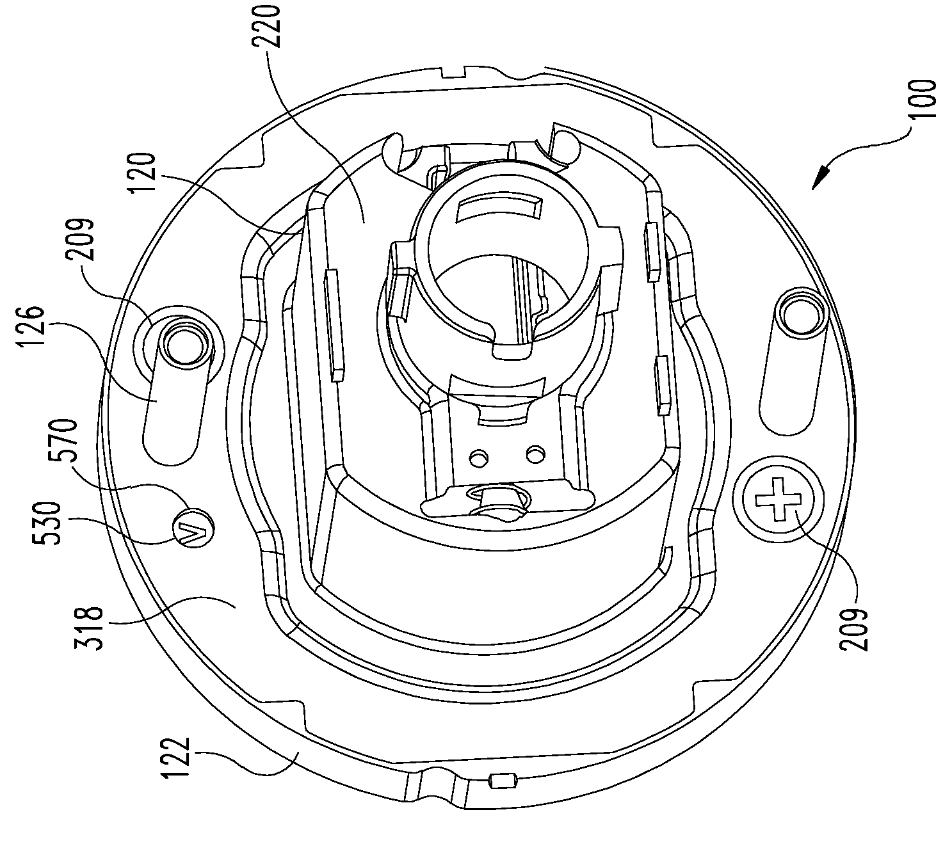
FIG. 11A is a perspective view of a portion of the lever assembly of FIG. 1 with a visual indicator that defines a clutching configuration.

FIGS. 11A and 11B show perspective back views of the outside drive assembly 120 assembled with the outer spring cage housing 122. A port 570 is formed within the flange 318 of the outside drive assembly 120. The port 570 is configured to align with one of the first and second visual indicators 530, 540 depending on whether the lock assembly 100 is in a clutching or non-clutching orientation. FIG. 11A shows the lock assembly 100 in a clutching configuration. In the clutching configuration, the visual indicator 530 displays a "V" through the port 570. FIG. 11B shows the lock assembly 100 in a non-clutching configuration. A pocket 540 or other character is displayed through the port 570 to indicate that the outside drive assembly 120 is positioned in the non-clutching configuration.

The outside drive assembly 120 can be converted between clutching and non-clutching operation by the following steps. Step 1: disassembly of the chassis 200 from the outer spring cage housing 122 by removing fasteners 209. Step 2: disassembly of the outer lever spindle 230 from the outer spring cage housing 122 and biasing mechanism 214. Step 3: rotation of the outer spring cage housing 122 by 180 degrees relative to the outer lever spindle 230. Step 4: reassembly of the outer lever spindle 230 to the outside spring cage housing 122 and biasing mechanism 214. Step 5: reassembly of the chassis 200 and fasteners 209 to the outer spring cage housing 122. In this manner the lock assembly 100 can be easily converted between the clutching and non-clutching orientation without using additional components or complete disassembly of the lock assembly 100.

In one aspect, the present disclosure includes a lock assembly comprising: an outer housing positionable adjacent an outer surface of a door; an aperture formed through the outer housing; a notch formed in an inner surface of the outer housing adjacent the aperture; an arcuate slot formed in the inner surface of the outer housing adjacent the aperture and across from the notch; an outside drive assembly coupled to the outer housing with a portion thereof positioned through the aperture; a lock control lug moveably coupled with the outside drive assembly, the lock control lug selectively engageable with the notch or the arcuate slot of the outer housing; an outer lever connected to the outside drive assembly; wherein the lever is in a non-clutching configuration when the lock control lug is engaged with the notch and the lever is in a clutching configuration when the lock control lug is engaged with the arcuate slot.

In refining aspects, the lock assembly includes wherein a notch and the arcuate slot are positioned approximately 180 degrees from another about the aperture; wherein the outside drive assembly is converted between the clutching and the non-clutching configurations when the outer housing is rotated approximately 180 degrees relative to the outside drive assembly; wherein a width of the notch is approximately the same as a width of the lock control lug; wherein a width of the arcuate slot is wider than the lock control lug and defines an angle of rotation of the lever in a locked state; further comprising a visual indicator formed on the inner surface of the outer housing; wherein the visual indicator corresponds to one of either the clutching or the non-clutching configuration; wherein the outside drive assembly includes a flange with a port formed therethrough; wherein the visual indicator is aligned with the port when the outside drive assembly is assembled with the outer housing wherein the visual indicator can be viewed through the port of the outside drive assembly; wherein the visual indicator includes one or more of an alpha numeric character, a symbol, and/or an open pocket; and wherein the outside drive assembly is removably connected to the outer housing via fastening means such as a threaded fastener, a pin, a clip, a retaining ring, snap-fit and/or press-fit, etc.

Another aspect of the present disclosure includes a cylindrical lock assembly comprising: an outer spring cage housing having an outer wall and an inner wall; a notch formed in a first portion of the inner wall; an elongate arcuate slot formed in a second portion of the inner wall, the elongate arcuate slot being positioned approximately 180 degrees from the notch; an outside drive assembly coupled to the outer spring cage housing; a lock control lug operably coupled with the outside drive assembly, the lock control lug being selectively engageable with the notch or the arcuate slot of the outer spring cage housing; and wherein the outside drive assembly defines a clutching configuration when the lock control lug is engaged with the arcuate slot and a non-clutching configuration when the lock control lug is engaged with the notch.

In refining aspects, the cylindrical lock assembly further comprises a visual indicator formed on the inner wall of the spring cage housing constructed to indicate whether the lock assembly is in a clutching or a non-clutching configuration; a flange extending from the outside drive assembly and connectable to the outer spring cage housing; wherein the flange of the outside drive assembly includes a port configured to align with the visual indicator on the outer spring cage housing; wherein the visual indicator includes at least one of an alpha numeric character, a symbol, and/or an open pocket; further comprising an outside lever spindle extending from the outside drive assembly; further comprising a lever handle connected to the outside lever spindle; and wherein the lever pivots relative to the outer spring cage housing in the clutching configuration and is fixed relative to the outer spring cage housing in the non-clutching configuration in a locked state.

Another aspect of the present invention includes a method for converting a lock assembly between a clutching and a non-clutching orientation comprising: forming a notch in an inner wall of an outer spring cage housing; forming an elongate arcuate slot in the inner wall of the spring cage housing, the notch and the elongate slot positioned on opposing sides of a through aperture formed in the spring cage housing; assembling an outside drive assembly with the outer spring cage housing; inserting a lock control lug operably coupled with the outside drive assembly into one of the notch and the arcuate slot; wherein engagement of the lock control lug with the notch defines an non-clutching orientation and engagement of the lock control lug with the arcuate slot defines a clutching orientation of the outside drive assembly; and rotating the outer spring cage housing approximately 180 degrees relative to the outside drive assembly such that the lock control lug engages with the other of the notch and the arcuate slot to convert the orientation of the lock assembly.

In refining aspects, the cylindrical lock assembly further comprises placing a visual indicator on the outer spring cage housing to display the orientation of the outside drive assembly; and forming a port in a portion of the outside drive assembly that aligns with the visual indicator of the outer spring cage housing It should be understood that the component and assembly configurations of the present disclosure can be varied according to specific design requirements and need not conform to the general shape, size, connecting means or general configuration shown in the illustrative drawings to fall within the scope and teachings of this patent application.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A lock assembly having an unlocked state and a locked state, the lock assembly comprising:
- a drive spindle;
- a manual actuator coupled to the drive spindle;
- a spring cage housing having a wall, the spring cage housing including a biasing member that interacts with the drive spindle to bias the drive spindle and the manual actuator to a home position;
- a notch formed in a first portion of the wall of the spring cage housing;
- an arcuate slot formed in a second portion of the wall of the spring cage housing;
- a drive assembly coupled to both the spring cage housing and the manual actuator;
- a lock control lug operably coupled with the drive assembly, the lock control lug being selectively positionable in:
  - the notch to define a non-clutching configuration of the lock assembly which prevents movement of the manual actuator relative to the spring cage housing via capture of the lock control lug within the notch, and
  - the arcuate slot to define a clutching configuration of the lock assembly which permits movement of the manual actuator relative to the spring cage housing via displacement of the lock control lug along the arcuate slot.

2. The lock assembly of claim 1, further comprising a visual indicator that visually displays whether the lock assembly is in the clutching configuration or the non-clutching configuration.

3. The lock assembly of claim 2, further comprising a flange extending from the drive assembly and connectable to the spring cage housing.

4. The lock assembly of claim 3, wherein the flange of the drive assembly includes a port configured to align with the visual indicator on the spring cage housing.

5. The lock assembly of claim 2, wherein the visual indicator includes at least one of an alpha numeric character, a symbol, and an open pocket.

6. The lock assembly of claim 1, wherein the manual actuator comprises a lever.

7. The lock assembly of claim 6, wherein the lever pivots relative to the spring cage housing in the clutching configuration and is fixed relative to the spring cage housing in the non-clutching configuration.

8. A method for converting a lock assembly having an unlocked state and a locked state between a clutching and a non-clutching configuration, the method comprising:
- coupling a drive assembly with both a manual actuator and a lock housing, the spring cage housing including a notch and an arcuate slot;
- positioning a lock control lug operably coupled with the drive assembly within one of the notch and the arcuate slot, wherein
  - positioning the lock control lug within the notch defines the non-clutching configuration which prevents movement of the manual actuator relative to the spring cage housing via capturing of the lock control lug within the notch; and
  - positioning the lock control lug within the arcuate slot defines the clutching configuration of the drive assembly which permits movement of the manual actuator relative to the lock via displacing the lock control lug along the arcuate slot; and
- converting the lock assembly between the clutching configuration and the non-clutching configuration by manually rotating the lock housing relative to the drive assembly and positioning the lock control lug within the other of the notch and the arcuate slot.

9. The method of claim 8, further comprising providing a visual indicator that visually displays whether the lock assembly is in the clutching configuration or the non-clutching configuration.

10. The method of claim 9, further comprising forming a port in a portion of the drive assembly that aligns with the visual indicator on the spring cage housing.

11. A method, comprising:
- positioning a lock assembly having a lock housing adjacent a surface of a door, wherein the lock housing has a notch and an arcuate slot, wherein the notch faces the arcuate slot and is positioned at an opposing location of the lock housing, wherein a drive assembly is coupled to the lock housing with a portion of the drive assembly extending through the aperture, and wherein a manual actuator is coupled to the drive assembly; and
- selectively positioning a lock control lug operably coupled with the drive assembly within one of the notch and the arcuate slot, wherein the lock control lug comprises an element of a clutch;
- wherein positioning the lock control lug within the notch prevents rotation of the manual actuator relative to the housing to define a non-clutching configuration of the lock assembly via capturing of the lock control lug within the notch; and
- wherein positioning the lock control lug within the arcuate slot permits rotation of the manual actuator relative to the housing to define a clutching configuration of the lock assembly via displacing the lock control lug along the arcuate slot; and converting the lock assembly between the clutching configuration and the non-clutching configuration by manually rotating the lock housing relative to the drive assembly and positioning the lock control lug within the other of the notch and the arcuate slot.

12. The method of claim 11, wherein the converting the lock assembly between the clutching configuration and the non-clutching configuration comprises rotating the lock housing approximately 180 degrees relative to the drive assembly.

13. The method of claim 11, wherein the notch and the arcuate slot are positioned approximately 180 degrees from one another relative to an axis about which the manual actuator rotates.

14. The method of claim 11, wherein a width of the notch is approximately the same as a width of the lock control lug to prevent rotation of the manual actuator relative to the lock housing when the lock assembly is in the non-clutching configuration.

15. The method of claim 11, wherein the lock control lug is free to move along the arcuate slot to permit rotation of the manual actuator relative to the lock housing when the lock assembly is in the clutching configuration.

16. The method of claim 11, further comprising providing a visual indication to visually display whether the lock assembly is in the clutching configuration or the non-clutching configuration.

17. The lock assembly of claim 1, wherein the spring cage housing comprises a central aperture extending therethrough and arranged along an axis, wherein the notch and the arcuate slot are each radially offset from the central aperture, and wherein the notch and the arcuate slot are angularly offset from one another relative to the axis.

18. The lock assembly of claim 1, wherein the spring cage housing is manually rotated relative to the drive assembly to transition the lock assembly between the clutching configuration and the non-clutching configuration.

19. The lock assembly of claim 1, wherein the notch and the arcuate slot are positioned approximately 180 degrees from one another relative to an axis about which the manual actuator rotates.

20. The lock assembly of claim 1, further comprising at least one visual indicator on the spring cage housing that is alignable with a port defined by the drive assembly to visually indicate whether the lock assembly is in the clutching configuration or the non-clutching configuration.

* * * * *